(12) United States Patent
Yang et al.

(10) Patent No.: US 11,093,604 B2
(45) Date of Patent: Aug. 17, 2021

(54) PERSONALIZED AND CRYPTOGRAPHICALLY SECURE ACCESS CONTROL IN TRUSTED EXECUTION ENVIRONMENT

(71) Applicant: BicDroid Inc., Petersburg (CA)

(72) Inventors: En-hui Yang, Petersburg (CA); Jin Meng, Kitchener (CA); Xiang Yu, Kitchener (CA); Hongtao Zhang, Waterloo (CA); Tomas Szuchewycz, Kitchener (CA)

(73) Assignee: BicDroid Inc., Petersburg (CA)

( * ) Notice: Subject to any disclaimer, the term of this patent is extended or adjusted under 35 U.S.C. 154(b) by 231 days.

(21) Appl. No.: 16/521,945

(22) Filed: Jul. 25, 2019

(65) Prior Publication Data

US 2020/0034528 A1  Jan. 30, 2020

Related U.S. Application Data

(60) Provisional application No. 62/703,933, filed on Jul. 27, 2018.

(51) Int. Cl.
*G06F 21/53*  (2013.01)
*H04L 9/32*  (2006.01)
(Continued)

(52) U.S. Cl.
CPC .............. *G06F 21/53* (2013.01); *G06F 21/31* (2013.01); *G06F 21/6218* (2013.01); *H04L 9/3242* (2013.01)

(58) Field of Classification Search
CPC ...... G06F 21/53; G06F 21/31; G06F 21/6218; H04L 9/3242
(Continued)

(56) References Cited

U.S. PATENT DOCUMENTS

2017/0344407 A1  11/2017  Jeon et al.
2021/0034763 A1*  2/2021  Li ..................... H04L 9/0866

FOREIGN PATENT DOCUMENTS

WO  2017098024 A1  6/2017

OTHER PUBLICATIONS

Yang et al., "Trust-E : A Trusted Embedded Operating System Based on the ARM Trustzone", 2014 IEEE International Conference on Ubiquitous Intelligence and Computing, pp. 495-501 (Year: 2014).*

(Continued)

*Primary Examiner* — Khalil Naghdali
(74) *Attorney, Agent, or Firm* — Bereskin & Parr LLP/S.E.N.C.R.L., s.r.l.

(57) ABSTRACT

An access control system includes a processor configured to provide a trusted execution environment isolated from a rich execution environment. A rich OS operates in the rich execution environment while a trusted OS operates in the trusted execution environment. An access monitoring module operates within the kernel of the rich OS and a trusted application operates in the trusted OS. The access monitoring module intercepts file requests directed at the file systems of the rich OS, and forwards the file requests to the trusted application. The trusted application then evaluates whether the file request is permitted and provides the access monitoring module with a response. The access monitoring module forwards the request to the file system only if the trusted application approves the request.

23 Claims, 13 Drawing Sheets

(51) Int. Cl.
*G06F 21/31* (2013.01)
*G06F 21/62* (2013.01)

(58) Field of Classification Search
USPC .......................................................... 726/26
See application file for complete search history.

(56) References Cited

OTHER PUBLICATIONS

Sun et al., "Reliable and Trustworthy Memory Acquisition on Smartphones", IEEE Transactions on Information Forensics and Security, vol. 10, No. 12, Dec. 2015, pp. 2547-2561 (Year: 2015).*
Jang et al., "SeCReT: Secure Channel between Rich Execution Environment and Trusted Execution Environment", 2015 Network and Distributed System Security (NDSS) Symposium, Feb. 2015, pp. 1-15.
International Search Report and Written Opinion of the Searching Authority dated Sep. 26, 2019 in respect of PCT/CA2019/051032.

* cited by examiner

PERSONALIZED AND CRYPTOGRAPHICALLY SECURE ACCESS CONTROL IN TRUSTED EXECUTION ENVIRONMENT

CROSS-REFERENCE TO RELATED APPLICATION

This application claims the benefit of the U.S. Provisional Application No. 62/703,933, filed on Jul. 27, 2018, the entirety of which is incorporated herein by reference.

FIELD

The described embodiments relate to systems and methods for file access control, and in particular to systems and methods for managing access to encrypted data files using a trusted execution environment.

INTRODUCTION

The following is not an admission that anything discussed below is part of the prior art or part of the common general knowledge of a person skilled in the art.

In an increasingly digital world, data is one of the most important assets for people, corporations, and nations. As a result, extensive measures are taken to ensure the security of sensitive data. However, as hacking techniques become more and more sophisticated, data security challenges are increasingly daunting.

One technique for managing data security is to predefine data access policies. The data access policies can specify whether a given program is permitted to access certain types of data. When the program makes a data request, the request can be compared against the access policies to determine whether the program is permitted to access the requested data.

Another technique for managing data security involves encrypting data files when they are stored on a system. An encryption key is then require to decrypt the stored data file, and access the plaintext data stored therein. Access to the encryption keys can be managed to prevent unauthorized access to the plaintext data of the stored data files. When an authorized user and/or program attempts to access an encrypted file, the file may be decrypted to allow the user/program to access the plaintext data stored therein.

Existing data protection techniques, such as those using access control policies and/or file encryption, are often performed in the kernel of a computer's operating system. Although the kernel is often considered more secure than the general user-mode portion of an operating system, computer kernels are being comprised (i.e. hacked) more frequently because of increasingly sophisticated hacking techniques being employed. Once a malevolent actor (e.g. a malevolent user or program) has access to the kernel, data security features implemented in the kernel become jeopardized and may be manipulated by the malevolent actor.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

An access control system is used to manage access to data files stored in non-volatile storage memory of a computer system. A portion of the access control system can be isolated from the main operating system to protect the access control system against kernel hacking.

A processor of the computer system can be configured to support at least two isolated execution environments. A first execution environment may be referred to as a rich execution environment (REE). A normal or rich operating system, such as Android, Linux, etc., can operate in the REE with user mode processes making calls to the kernel of the REE. The kernel of the REE can include an access monitoring module that receives calls from user mode processes to access data stored by the computer system.

The second execution environment may be referred to as a trusted execution environment (TEE). The trusted execution environment can be isolated from the rich execution environment, such that processes operating within the rich execution environment cannot access code or data within the trusted execution environment. A trusted operating system can operate in the TEE. A trusted application operates in the trusted operating system to manage access to data files in response to the data requests received by the access monitoring module. The trusted application and the access monitoring module can communicate securely to manage data access by user mode processes operating in the rich operating system.

The trusted application may provide personalized and cryptographically secure access control that can reduce or eliminate problems associated with access control that is implemented directly in the kernel of the primary operating system. The access control system may still be integrated into the file systems of the kernel of a rich operating system, i.e. through use of the access monitoring module. In some embodiments, the trusted application that operates in the trusted operating system can intercept and examine all file requests and operations directed at encrypted files stored in the non-volatile storage memory (e.g. through communication with the access monitoring module).

In a first broad aspect, there is provided an access control system comprising: a processor configured to provide at least two isolated execution environments, wherein the at least two isolated execution environments comprise a rich execution environment and a trusted execution environment, and the processor is configured to operate a rich operating system in the rich execution environment and a trusted operating system in the trusted execution environment, wherein a kernel of the rich operating system is configured to include a file access monitoring module and wherein a trusted access monitoring application operates on the trusted operating system; and a non-volatile storage memory configured to store a plurality of data files, wherein the plurality of data files includes a plurality of encrypted data files; wherein the file access monitoring module is configured to: receive a file request for a requested file stored in the non-volatile storage memory, wherein the requested file corresponds to one of the encrypted data files in the plurality of encrypted data files, and wherein the file request is received from a requesting process operating on the rich operating system; and transmit file request data to the trusted access monitoring application, wherein the file request data comprises file access data associated with the requested file and process identification data associated with the requesting process; the trusted access monitoring application is configured to: receive the file request data; determine file identification data associated with the requested file from the file access data; determine whether the requesting process is permitted to access the requested file by comparing the file identification data and the process identification data with file access criteria stored by the trusted access monitoring application; and in response to determining that the requesting process is permitted to access the requested file: derive an encryption key corresponding to the requested file; and transmit the encryption key to the file access monitoring module; and the file access monitoring module is configured to, in response to receiving the encryption key, decrypt the requested file using the encryption key, and provide the decrypted file to the requesting process.

In any embodiment, each encrypted data file in the plurality of encrypted data files may be encrypted using a file-specific encryption key, and the file-specific encryption key may be determined independently for each encrypted data file.

In any embodiment, the file access data associated with the requested file may include key information, and the trusted access monitoring application may be configured to derive the encryption key corresponding to the requested file using the key information.

In any embodiment, the file access data included in the file request data may be encrypted file access data, where the encrypted file access data is encrypted using a secret access key stored by the trusted access monitoring application; and the trusted access monitoring application may be configured to determine the file access data from the received file request data by: determining the secret access key associated with the requested file; decrypting the encrypted file access data using the secret access key; and determining the file access data as the decrypted file access data.

In any embodiment, the trusted access monitoring application may be configured to: store the secret access key as an encrypted access key; and determine the secret access key by decrypting the encrypted access key.

In any embodiment, the trusted access monitoring application may be configured to: determine the secret access key by: receiving user credentials from a user mode process operating in the rich operating system, where the user credentials are received via the file access monitoring module; and decrypt the encrypted access key using the user credentials to determine the secret access key.

In any embodiment, the file access monitoring module and the trusted access monitoring application may be configured to communicate using a secure communication channel, where the secure communication channel may be established by the processor during a boot procedure of the rich operating system and the trusted operating system.

In any embodiment, the file access monitoring module may be configured to store a shared communication channel key corresponding to the secure communication channel; the trusted access monitoring application may be configured to store the same shared communication channel key; the file access monitoring module may be further configured to transmit the file request data to the trusted access monitoring application by: generating an encrypted file request message by encrypting the file request data using the shared communication channel key; generating a hashed message by hashing the file request data using the shared communication channel key; and transmitting the encrypted file request message and the hashed message to the trusted access monitoring application; and the trusted access monitoring application may be further configured to: determine a validity of the file request data by: generating a decrypted file request message by decrypting the encrypted file request message using the shared communication channel key; generating a hashed decrypted message by hashing the decrypted file request message using the shared communication channel key; comparing the hashed decrypted message to the hashed message; and determining that the received file request data is valid when the hashed decrypted message and the hashed message match; and determine that the requesting process is permitted to access the requested file only if the received file request data is valid.

In any embodiment, the file access monitoring module may be configured to: receive a file creation request from a creating process operating in the rich operating system; determine that the file creation request relates to creating an additional encrypted data file; transmit an encrypted file creation request to the trusted access monitoring application, where the encrypted file creation request comprises process identification data corresponding to the creating process; the trusted access monitoring application may be configured to: determine that the creating process is permitted to generate the additional encrypted data file by comparing the process identification data with file creation criteria stored by the trusted access monitoring application; in response to determining that the creating process is permitted to generate the additional encrypted data file, generate additional file identification data for the additional encrypted data file based on the file access criteria; generate additional key information for the additional encrypted data file; generate an additional encryption key for the additional encrypted data file using the additional key information; define file access data using the additional file identification data and the additional key information; generate additional encrypted file access data by encrypting the file access data using a secret access key stored by the trusted access monitoring application; transmit the additional encryption key and the additional encrypted file access data to file access monitoring module; the file access monitoring module may be further configured to: provide the additional encryption key and the additional encrypted file access data to a file system of the rich operating system, where the file system is operable to use the additional encryption key to generate the additional encrypted data file, and the file system is operable to store the additional encrypted data file in the non-volatile storage memory and to store the additional encrypted file access data in the non-volatile storage memory in association with the additional encrypted data file.

In any embodiment, the file request may include a file operation request, where the file operation request identifies a requested operation that the requesting process is requesting to perform on the requested file; the file access monitoring module may be configured to include operation data associated with the requested operation in the file request data transmitted to the trusted access monitoring application; the trusted access monitoring application may be configured to: determine whether the requesting process is permitted to perform the requested operation on the requested file by comparing the file identification data, the process identification data, and the operation data with the file access criteria stored by the trusted access monitoring application; and in response to determining that the requesting process is permitted to perform the requested operation on the requested file, transmit an operation permitted signal to the file access monitoring module; in response to determining that the requesting process is not permitted to perform the requested operation on the requested file, transmit an operation denied signal to the file access monitoring module; the file access monitoring module may be further configured to: in response to receiving the operation permitted signal, provide the decrypted file to the requesting process to enable the requested operation; and in response to receiving the operational denied signal, prevent the requesting process from performing the requested operation.

In any embodiment, the trusted access monitoring application may be configured to maintain an activation record of one or more user-specific processes operating on the rich operating system, where the activation record includes active process identification data associated with each user-specific process operating on the rich operating system; the file access monitoring module may be configured to: transmit a process initiation message to the trusted access monitoring application in response to determining that a new user-specific process is operating on the rich operating system, where the process initiation message includes the active process identification data associated with the new user-specific process, and where the process initiation message is generated using valid user credentials from a user of the processor, where the user credentials are solicited from the user following a determination that the new user-specific process is operating on the rich operating system; transmit a process termination message to the trusted access monitoring application in response to determining that a particular user-specific process is no longer operating on the rich operating system, where the particular user-specific process is associated with active process identification data included on the activation record, where the process termination message includes the active process identification data with the particular user-specific process; and the trusted access monitoring application may be configured to in response to receiving the process initiation message, update the activation record to include the active process identification data associated with the new user-specific process; in response to receiving the process termination message, update the activation record to remove the active process identification data associated with the particular user-specific process; and determine that the requesting process is permitted to access the requested file only when the activation record includes active process identification data associated with the requesting process.

In accordance with another broad aspect, there is provided a method of controlling access to a plurality of data files stored in a non-volatile storage memory, wherein the plurality of data files includes a plurality of encrypted data files, the method performed using a processor configured to provide at least two isolated execution environments, wherein the at least two isolated execution environments comprise a rich execution environment and a trusted execution environment, and the processor is configured to operate a rich operating system in the rich execution environment and a trusted operating system in the trusted execution environment, the method comprising: operating a file access monitoring module in a kernel of the rich operating system to: receive a file request for a requested file stored in the non-volatile storage memory, wherein the requested file corresponds to one of the encrypted data files in the plurality of encrypted data files, and wherein the file request is received from a requesting process operating on the rich operating system; and transmit file request data to a trusted access monitoring application operating on the trusted operating system, wherein the file request data comprises file access data associated with the requested file and process identification data associated with the requesting process; operating the trusted access monitoring application to: receive the file request data; determine file identification data associated with the requested file from the file access data; determine whether the requesting process is permitted to access the requested file by comparing the file identification data and the process identification data with file access criteria stored by the trusted access monitoring application; and in response to determining that the requesting process is permitted to access the requested file: derive an encryption key corresponding to the requested file; and transmit the encryption key to the file access monitoring module; and operating the file access monitoring module to, in response to receiving the encryption key, decrypt the requested file using the encryption key, and provide the decrypted file to the requesting process.

In any embodiment, each encrypted data file in the plurality of encrypted data files may be encrypted using a file-specific encryption key, and the file-specific encryption key may be determined independently for each encrypted data file.

In any embodiment, the file access data associated with the requested file may include key information, and the method may include operating the trusted access monitoring application to derive the encryption key corresponding to the requested file using the key information.

In any embodiment, the file access data included in the file request data may be encrypted file access data, where the encrypted file access data is encrypted using a secret access key stored by the trusted access monitoring application; and the method may include operating the trusted access monitoring application to determine the file access data from the received file request data by: determining the secret access key associated with the requested file; decrypting the encrypted file access data using the secret access key; and determining the file access data as the decrypted file access data.

In any embodiment, the method may include operating the trusted access monitoring application to: store the secret access key as an encrypted access key; and determine the secret access key by decrypting the encrypted access key.

In any embodiment, the method may include operating the trusted access monitoring application to: determine the secret access key by: receiving user credentials from a user mode process operating in the rich operating system, wherein the user credentials are received via the file access monitoring module; and decrypt the encrypted access key using the user credentials to determine the secret access key.

In any embodiment, the method may include: establishing a secure communication channel during a boot procedure of the rich operating system and the trusted operating system; and operating the file access monitoring module and the trusted access monitoring application to communicate using the secure communication channel.

In any embodiment, the method may include: operating the file access monitoring module to store a shared communication channel key corresponding to the secure communication channel; operating the trusted access monitoring application to store the same shared communication channel key; operating the file access monitoring module to transmit the file request data to the trusted access monitoring application by: generating an encrypted file request message by encrypting the file request data using the shared communication channel key; generating a hashed message by hashing the file request data using the shared communication channel key; and transmitting the encrypted file request message and the hashed message to the trusted access monitoring application; and operating the trusted access monitoring application to: determine a validity of the file request data by: generating a decrypted file request message by decrypting the encrypted file request message using the shared communication channel key; generating a hashed decrypted message by hashing the decrypted file request message using the shared communication channel key; comparing the hashed decrypted message to the hashed message; and determining that the received file request data is valid when the hashed decrypted message and the hashed message match; and determine that the requesting process is permitted to access the requested file only if the received file request data is valid.

In any embodiment, the method may include: operating the file access monitoring module to: receive a file creation request from a creating process operating in the rich operating system; determine that the file creation request relates to creating an additional encrypted data file; transmit an encrypted file creation request to the trusted access monitoring application, where the encrypted file creation request includes process identification data corresponding to the creating process; operating the trusted access monitoring application to: determine that the creating process is permitted to generate the additional encrypted data file by comparing the process identification data with file creation criteria stored by the trusted access monitoring application; in response to determining that the creating process is permitted to generate the additional encrypted data file, generate additional file identification data for the additional encrypted data file based on the file access criteria; generate additional key information for the additional encrypted data file; generate an additional encryption key for the additional encrypted data file using the additional key information; define file access data using the additional file identification data and the additional key information; generate additional encrypted file access data by encrypting the file access data using a secret access key stored by the trusted access monitoring application; transmit the additional encryption key and the additional encrypted file access data to file access monitoring module; operating the file access monitoring module to: provide the additional encryption key and the additional encrypted file access data to a file system of the rich operating system, where the file system is operable to use the additional encryption key to generate the additional encrypted data file, and the file system is operable to store the additional encrypted data file in the non-volatile storage memory and to store the additional encrypted file access data in the non-volatile storage memory in association with the additional encrypted data file.

In any embodiment, the file request may include a file operation request, where the file operation request identifies a requested operation that the requesting process is requesting to perform on the requested file, and the method may include: operating the file access monitoring module to include operation data associated with the requested operation in the file request data transmitted to the trusted access monitoring application; operating the trusted access monitoring application to: determine whether the requesting process is permitted to perform the requested operation on the requested file by comparing the file identification data, the process identification data, and the operation data with the file access criteria stored by the trusted access monitoring application; and in response to determining that the requesting process is permitted to perform the requested operation on the requested file, transmit an operation permitted signal to the file access monitoring module; in response to determining that the requesting process is not permitted to perform the requested operation on the requested file, transmit an operation denied signal to the file access monitoring module; and operating the file access monitoring module to: in response to receiving the operation permitted signal, provide the decrypted file to the requesting process to enable the requested operation; and in response to receiving the operational denied signal, prevent the requesting process from performing the requested operation.

In any embodiment, the method may include: operating the trusted access monitoring application to maintain an activation record of one or more user-specific processes operating on the rich operating system, where the activation record includes active process identification data associated with each user-specific process operating on the rich operating system; operating the file access monitoring module to: transmit a process initiation message to the trusted access monitoring application in response to determining that a new user-specific process is operating on the rich operating system, where the process initiation message includes the active process identification data associated with the new user-specific process, and where the process initiation message is generated using valid user credentials from a user of the processor, where the user credentials are solicited from the user following a determination that the new user-specific process is operating on the rich operating system; transmit a process termination message to the trusted access monitoring application in response to determining that a particular user-specific process is no longer operating on the rich operating system, where the particular user-specific process is associated with active process identification data included on the activation record, where the process termination message includes the active process identification data with the particular user-specific process; and operating the trusted access monitoring application to in response to receiving the process initiation message, update the activation record to include the active process identification data associated with the new user-specific process; in response to receiving the process termination message, update the activation record to remove the active process identification data associated with the particular user-specific process; and determine that the requesting process is permitted to access the requested file only when the activation record includes active process identification data associated with the requesting process.

In accordance with another broad aspect there is provided a computer-readable medium having stored thereon non-transitory computer readable instructions for controlling access to a plurality of data files stored in a non-volatile storage memory, wherein the plurality of data files includes a plurality of encrypted data files, the instructions executable by a processor configured to provide at least two isolated execution environments, wherein the at least two isolated execution environments comprise a rich execution environment and a trusted execution environment, and the processor is configured to operate a rich operating system in the rich execution environment and a trusted operating system in the trusted execution environment, wherein the instructions are defined to configured the processor to: operate a file access monitoring module in a kernel of the rich operating system to: receive a file request for a requested file stored in the non-volatile storage memory, wherein the requested file corresponds to one of the encrypted data files in the plurality of encrypted data files, and wherein the file request is received from a requesting process operating on the rich operating system; and transmit file request data to a trusted access monitoring application operating on the trusted operating system, wherein the file request data comprises file access data associated with the requested file and process identification data associated with the requesting process; operate the trusted access monitoring application to: receive the file request data; determine file identification data associated with the requested file from the file access data; determine whether the requesting process is permitted to access the requested file by comparing the file identification data and the process identification data with file access criteria stored by the trusted access monitoring application; and in response to determining that the requesting process is permitted to access the requested file: derive an encryption key corresponding to the requested file; and transmit the encryption key to the file access monitoring module; and operate the file access monitoring module to, in response to receiving the encryption key, decrypt the requested file using the encryption key, and provide the decrypted file to the requesting process.

In any embodiment, the instructions may be defined to be executable by a processor to configure the processor to perform an access control method as shown and described herein.

It will be appreciated by a person skilled in the art that a system, method or computer readable medium disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

The drawings included herewith are for illustrating various examples of articles, methods, and apparatuses of the teaching of the present specification and are not intended to limit the scope of what is taught in any way.

DESCRIPTION OF EXEMPLARY EMBODIMENTS

Figure 1:
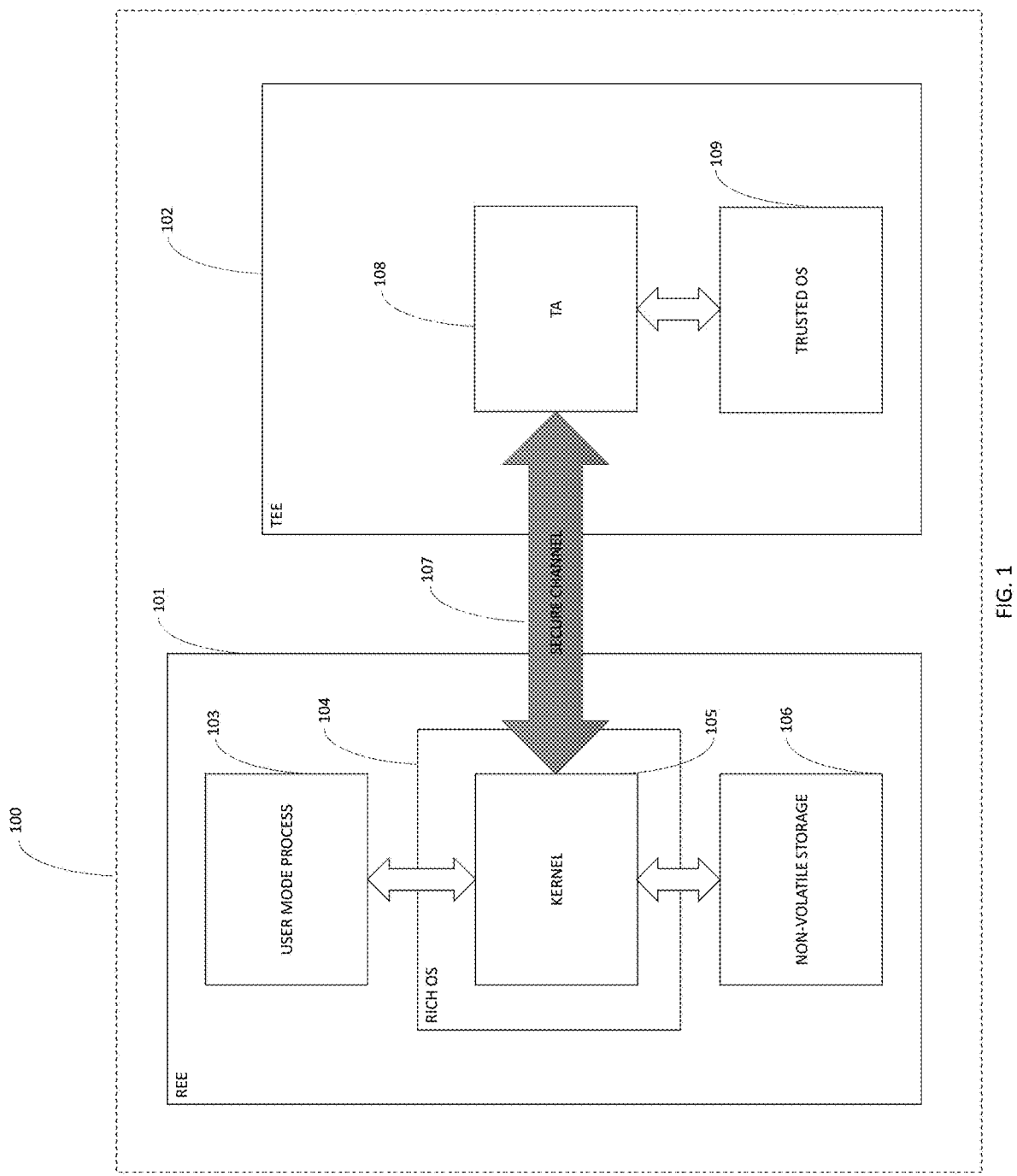
FIG. 1 is a block diagram illustrating a computer system in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

Embodiments described herein provide systems, methods and computer program products that may enable personalized and cryptographically secure access control to be implemented within a computer system using a trusted execution environment. This may help maintain data security, even when the kernel of a rich operating system operating in the computer system is breached.

A computer program is a group of instructions that can be executed by a computer (i.e. by a processor). A process is an instance of a program, i.e. a copy of a program in computer memory that is ready to be executed by the computer's central processing unit(s) (CPUs). In the discussion that follows, reference is made to a processor of a computer system and operations performed by the processor of a computer system. It should be understood that such references encompass one or more processing elements and the use of one or more processing elements to perform operations, such as one or more processing cores within one or more CPUs.

An operating system (OS) is software (including several programs and libraries) that controls the use of hardware and software resources available to a computer. The core component of an OS, a kernel, is a program that manages all the computer hardware devices. At runtime, kernel processes instantiated from the kernel also manage processes instantiated from programs other than the kernel (e.g. programs initiated by a user) and provide unified interfaces (called system calls) for those non-kernel processes to access hardware devices.

Processors can be configured to distinguish instructions from the kernel and instructions from programs other than the kernel, and execute the instructions in separate modes, namely a kernel mode and a user mode. Processes instantiated within the operating system from programs other than the kernel (i.e. external to the kernel) may be referred to herein as user mode processes.

Within the kernel, file systems are essential modules that provide user mode processes with access to non-volatile storage such as disks, flash memory, etc. From the perspective of a user mode process, the process accesses and operates (e.g. opens/reads/writes/closes) files on non-volatile storage by issuing system calls to the OS kernel. Upon receiving those system calls, the OS kernel manages if and how the requesting process can access the requested files. The OS kernel can perform access control by arbitrating whether the requesting process (the process issuing the system call) is allowed to access the targeted file or directory based on information regarding the issuer and targeted file, use the file system modules to fulfill the system call(s) if access is allowed, and notify user mode processes through return values of the system calls.

In order to manage file access and provide data security, the computer system may implement a mandatory access control (MAC) process. In MAC, every user mode process can be labelled with an associated process label and every file can be labelled with an associated file label. Access policies can be predefined and loaded into the kernel memory. The access policies can specify whether a user mode process with a particular process label can access a file with a particular file label. In some cases, the access policies can include access criteria for each and every process label and file label (e.g. for each possible combination of process label and file label).

When a user mode process issues an operation request to a file, the kernel can check the label of the user mode process and the label of the file against the predefined policies. The kernel can then grant or reject the operation request accordingly.

In some cases, the process labels for user-mode processes operating in a computer system can be predefined. Alternately or in addition, the labels of the user mode processes can be defined using a label inheritance process. The label of a first user mode process can be pre-defined and then other, subsequently instantiated, processes can inherit their process labels from the processes that create them (namely parent processes) by default. This may allow process labels to be assigned when the corresponding user mode processes are instantiated. In some cases, the process label assigned to a user mode process may be changed to a different process label through system calls to the kernel.

The non-volatile storage of the computer system can be used to store a plurality of data files. File labels can be stored in the non-volatile storage memory in association with the data files to which they are assigned. For example, file labels can be stored as file attributes by file systems. The file attributes can then be read into kernel memory when the associated data files are accessed.

In general, data files are used to store information. When the information is stored in a directly readable/understandable manner (i.e. not obfuscated or otherwise coded to prevent direct understanding of the information), the data file may be referred to as being plaintext. In some cases, the data files may be modified (i.e. encrypted) to prevent unauthorized access to the plaintext information stored by that data file.

Encryption is a process that uses a secret (an encryption key) to transform the information (i.e. the plaintext) into an obfuscated form (which may be referred to as ciphertext). Decryption is the reverse process of encryption and uses a secret (e.g. the encryption key or a different decryption key depending on the encryption method used) to transform ciphertext to plaintext.

In some cases, file systems (such as the ext4 filesystem and the NTFS file system) may support file system-level encryption for data files stored in the computer system. In file system-level encryption, the encryption/decryption of data in individual data files can be performed by the file system. The system can define encryption policies related to the stored files (including whether a file has been or should be encrypted and how encryption key(s) is/are derived) on an individual basis (i.e. on a per-file basis). When a file is created, or stored, the file system can employ the encryption policies to determine whether the file should be encrypted prior to storage, and then the file system can implement the encryption and storage of the data files as appropriate. When a file is accessed, the file system can use the encryption policies and decrypt the data file before providing the decrypted data file to a requesting process. Because the encryption/decryption is performed by the file system, file system-level encryption is transparent to user mode processes, which access files and perform operations on files through system calls as normal.

To facilitate individual encryption policies for each file, a cryptographic attribute can be defined for each encrypted file. The cryptographic attributed can be generated and stored by the file system for each encrypted file. For example, the cryptographic attribute can be stored as a file attribute in associated with each encrypted file. The cryptographic attribute may include key information that is usable to determine the encryption key for that file. The encryption key for a file may then be derived based on the cryptographic attribute associated with that file, and the derived encryption key can be used to encrypt/decrypt data in the file in response to requests from legitimate user mode processes.

In some cases, MAC and encryption key derivation for file system-level encryption can be performed in the OS kernel. While the OS kernel is considered relatively more secure than user mode processes, with increasingly sophisticated hacking techniques kernels are being hacked more commonly. Once the kernel is hacked, data security features that may be provided by the kernel, such as MAC and files system-level encryption, can be jeopardized. For example, MAC may be skipped when the behavior of the OS kernel is breached and can be manipulated by hackers, which may result in authorized access to data.

In the case of a hacked kernel, MAC may not be essential for data access, i.e. data can still be accessed even when MAC is skipped. Moreover, because MAC is an automatic mechanism that occurs without user involvement, intelligent malware may operate to mimic the behavior of a legitimate process to fool the MAC policies into granting access to data. As a result, sensitive data may be accessed without any knowledge of the breach on the part of the legitimate users of the computer system.

Embodiments described herein includes systems, methods and computer program products that may provide access control for data files stored in a computer system. Embodiments described herein may provide access control systems that can implement MAC and encryption key derivation for file system-level encryption while protecting against kernel hacking. This may further enhance data security. Embodiments described herein may enable personalized and cryptographically secure access control implemented using a trusted execution environment.

In embodiments described herein, a computer system can include non-volatile storage memory and a processor. The processor can be configured to provide at least two isolated execution environments.

A first execution environment may be referred to as a rich execution environment. The processor may operate a rich operating system within the rich execution environment. User mode processes may make calls to the kernel of the rich operating system in order to access, and perform operations on, files stored in the non-volatile storage memory. The rich operating system may be the main or primary operating system with which a user of the computer system interacts.

A second execution environment may be referred to as a trusted execution environment. The processor may operate a trusted operating system within the trusted execution environment. The trusted execution environment can be isolated from the rich execution environment, such that processes operating within the rich execution environment cannot access code or data within the trusted execution environment.

A file access monitoring module can be implemented in the kernel of the rich operating system. In the description and figures herein, the file access monitoring module may also be referred to as a trusted application agent or TA agent. The file access monitoring module can be configured to monitor and intercept data file requests received from user mode processes operating within the rich operating system.

A trusted access monitoring application (also referred to as a key management trusted application, key management TA or KMTA) can operate on the trusted operating system. The trusted access monitoring application can be configured to communicate with the file access monitoring module in order to implement secure access control in response to file requests received by the file access monitoring module.

The non-volatile storage memory of the computer system can be used to store a plurality of data files. The plurality of data files can include a plurality of encrypted data files. Each encrypted file can have associated file access data (also referred to as a key attribute) that can be used by the trusted access monitoring application to regulate access to that encrypted file.

The file access data may include file identification data, such as a MAC file label, associated with the encrypted file. The file access data may also include key information associated with the encrypted file. The key information may be required to derive the encryption key associated with that encrypted file.

The file access data associated with each encrypted data file may be stored as encrypted file access data. The encrypted file access data may be encrypted using a secret access key. The secret access key may then be required to decrypt the file access data, and in turn determine the file identification data and key information associated with the data file.

In some cases, the secret access key may only be available in the KMTA. When a user mode process (a creating process) operating on the rich operating system attempts to create a new encrypted file, the TA agent can collect the process label associated with the creating process. The TA agent can then transmit the process label associated with the creating process to the KMTA.

In response to receiving the process label associated with the creating process, the KMTA can implement access control policies (stored within the trusted OS) to determine whether the creating process is permitted to create the encrypted file. If the creating process is permitted to create the encrypted file, the KMTA may use the access control policies to determine the file label to be used for this new encrypted file.

If the creating process is not permitted to create the encrypted file, the KMTA can generate an access denied signal and send the access denied signal to the TA agent. Upon receiving an access denied signal, the TA agent can immediately reject the file creation request from the creating process. The TA agent can also prevent the encrypted file from being stored by the file system.

If the creating process is permitted to create the encrypted file, the KMTA can generate an access granted signal. The KMTA can also generate key information for the new encrypted file and derive an encryption key using this key information. A key attribute (i.e. file access data) can be generated. The key attribute can include file identification data (e.g. a file label) and the key information. The file identification data can be determined based on the stored access control policies.

The key attribute may also be encrypted by the KMTA using the secret access key. The KMTA can transmit the access granted signal, the encryption key and the key attribute to the TA agent. The encryption key and key attribute may be transmitted as a combined message payload.

Upon receiving an access granted signal (and the associated encryption key and key attribute), the TA agent can approve the file creation request from the creating process. The TA agent may then pass the key attribute to the file system as a file attribute and provide the encryption key to the file system to enable the file system to fulfill the file creation operation (i.e. to generate, encrypt and store the new encrypted file).

When a user mode process (a requesting process) operating on the rich operating system attempts to perform an operation on an existing encrypted file (a requested file), the TA agent can intercept the file operating request. The TA agent can then collect the process identification data associated with the requesting process and the file access data of the requested file. The TA agent can send the process identification data and the file access data, along with operation data indicating the nature of the requested operation, to the KMTA in a file request. Upon receiving the file request from the TA agent, the KMTA can, if necessary, decrypt the file access data and apply the stored access control policies to determine whether the requesting process can perform the requested operation on the requested file.

If the KMTA determines that the requesting process is not permitted to perform the requested file operation, the KMTA can generate an access denied signal. The KMTA can transmit the access denied signal to the TA agent. Upon receiving the access denied signal, the TA agent rejects the file operation request from the requesting process. The TA agent can prevent the requesting process from performing the requested operation on the requested encrypted file.

If the KMTA determines that the requesting process is permitted to perform the requested file operation, the KMTA can generate an access granted signal. In addition, if the requested file operation requires an encryption key, the KMTA can generate an encryption key using the key information from the key attribute. The KMTA can send the access granted signal and the encryption key (if necessary) to the TA agent. Upon receiving the access granted signal (and possibly the encryption key), the TA agent can approve the file operation request. The TA agent may also provide the encryption key (if received from the KMTA) to file system modules to fulfill the requested file operation.

The KMTA may use a secret access key to encrypt and decrypt file access data. The secret access key used by the KMTA to decrypt and encrypt key attributes (i.e. file access data) may be available to the KMTA only after valid user credentials are received. A user may be prompted to provide user credentials when initiating a session of the rich operating system. The KMTA may validate the user credentials prior to determining the secret access key.

A user may be prompted to provide user credentials when a file request is being transmitted to the KMTA. For example, the user may be prompted to provide user credentials for each file request intercepted by the file access monitoring module.

The access control system may include a user mode service process that is operable to collect credentials from a user of the rich operating system. The secret key used by the KMTA to decrypt and encrypt key attributes may be available to the KMTA only after valid user credentials have been collected by the user service mode program.

Optionally, the KMTA may use process label activation records to manage file access. The KMTA may store and manage the activation records to maintain a list of active processes that have been validated. The process identification data (or process labels) listed in the process label activation records can be validated by user credentials solicited from a user of the rich operating system.

During operation of the rich operating system, when a process label is initially assigned to a user mode process, user credentials can be solicited by a user mode service process (that may be controlled by, or in communication with, the file access monitoring module). A process activation signal can be generated by the service process and/or the TA agent. The process activation signal can be generated based on the process identification data and the user credentials. The TA agent can transmit the process activation signal to the KMTA. The KMTA can then verify the process activation signal, e.g. by validating the user credentials.

Once the process activation signal is verified, the KMTA can update the activation records to indicate that the process associated with the received process identification data is active and has been validated. The KMTA may refer to the process activation records in response to each file request to establish that the requesting process has been validated, and may only authorize the file request upon determining that the requesting process corresponds to process identification data stored in the process activation records.

When the TA agent determines that a user mode process is about to terminate, or about to change its process label, the TA agent can transmit a process termination signal to the KMTA. In response to the process termination signal, the KMTA can update the process activation records to remove the corresponding process identification data.

The file access monitoring module (i.e. TA agent) and trusted access monitoring application (i.e. KMTA) may communicate using a secure communication channel. The secure communication channel may ensure that messages transmitted between the file access monitoring module and the trusted access monitoring application are encrypted and the information in those messages cannot be determined if a message is intercepted. The secure communication channel may also allow the TA agent and KMTA to determine that a received message was validly transmitted by the other of the TA agent and KMTA.

The secure channel may be established between the TA agent and the KMTA over an unsecured communication channel. For example, during the booting procedure of the rich OS and the trusted OS, the TA agent can transmit a key generation request to the KMTA through the unsecured channel. The KMTA may then randomly generate a secure channel key and store the secure channel key in the memory of the trusted OS. The KMTA can transmit the secure channel key to the TA agent through the unsecured channel. The TA agent can then store the secure channel key TA agent memory.

In some cases, the KMTA can check the memory of the trusted operating system to determine whether a secure channel key has already been generated in response to receiving the key generation request. If a secure channel key already exists, the KMTA may decline the key generation request.

Once the shared channel key is stored by both the TA agent and the KMTA, a secure channel key between the TA agent and the KMTA can be established. When a message is transmitted from the TA agent to the KMTA (or from the KMTA to the TA agent), the TA agent (or the KMTA) can use the shared key to hash and encrypt the message. Upon receiving the hash and the message, the KMTA (or the TA agent) can use the shared key to decrypt the message. The recipient can then hash the decrypted message and compare the generated hash against the received hashed message. The message may then only be accepted if the hashes match. Otherwise, the message may be discarded. This may allow the TA agent (or the KMTA) to determine whether a received message is sent by a legitimate KMTA (or TA agent) that has not been tampered with.

System Architecture

The following is a description of a system architecture that may be used by itself in any access control system or method, or in any combination or sub-combination with any other feature or features disclosed including the file creation process, the file opening process, the file operation process, the secret key generation process, the process activation records, and the secure communication channel.

FIG. 1 shows an example of a computer system 100 that may be used in accordance with the embodiments described herein. The example computer system 100 shown in FIG. 1 may be any type of computer system, such as a mobile device (e.g. a smartphone or tablet), a laptop computer, a desktop computer, a server and the like.

In general, the computer system 100 can include a processor (e.g. a microprocessor having one or more CPU cores) and memory. The processor can be to the memory via a computer data bus.

The memory may include both volatile memory and non-volatile memory such as non-volatile storage memory 106. Non-volatile memory stores computer programs consisting of computer-executable instructions, which may be loaded into volatile memory for execution by the processor as needed. It will be understood by those of skill in the art that references herein to computer system 100 as carrying out a function or acting in a particular way imply that one or more cores of the processor are executing instructions (e.g., a software program) stored in memory and possibly transmitting or receiving inputs and outputs via one or more interface.

Memory may also store data input to, or output from, processor in the course of executing the computer-executable instructions. For example, non-volatile storage memory 106 can be configured to store a plurality of data files. The plurality of data files may include a plurality of encrypted data files. In particular, the kernel 105 and file system modules operating within the kernel 105 may enable user mode processes 103 to access non-volatile storage 106, and perform operations related to files stored in non-volatile storage 106.

The file system modules operating within the kernel 105 may be configured to store data files in the non-volatile storage 106 using a database structure. For example, a relational database or non-relational database, such as a key-value database, NoSQL database, or the like may be used to store the data files.

The processor can provide at least two isolated execution environments. The isolated execution environments can include a rich execution environment (REE) 101 and a trusted execution environment (TEE) 102. The processor can define the REE 101 and TEE 102 to operate in isolation from one another, such that the code and data loaded in the TEE 102 cannot be accessed by the REE 101. The TEE 102 may be contained within a more secure portion of the processor to provide increased security for TEE 102. The computer memory can be divided into two parts, secure memory and non-secure memory. The secure memory may only be accessible to the TEE 102.

The processor can be configured to provide separate operating systems in the REE 101 and TEE 102. The processor can operate a rich operating system 104 in the REE 101, such as an Android operating system, Linux operating system, Microsoft Windows™ operating system etc. The rich OS 104 includes a kernel 105 that facilitates user mode processes 103 running on the rich OS 104 to access resources of the computer system 100. The user mode processes 103 may make calls to the kernel 105 of the rich operating system 104 in order to access, and perform operations on, files stored in the non-volatile storage memory 106. During normal operation, a user interacting with the computer system 100 may only interact directly with the rich operating system 104.

The processor can also be configured to provide a trusted operating system 109 in the trusted execution environment 102. The trusted operating system 109 can be loaded into, and operate within, the trusted execution environment 102.

In general, the trusted operating system 109 may be implemented by an operating system configured according to a defined set of operational criteria having a greater level of security than the rich operating system. For example, the trusted OS 109 may have less capacity but higher security than rich OS 104. For example, the trusted operating system 109 may be defined in accordance with criteria such as the Common Criteria for Information Technology Security Evaluation (e.g. ISO/IEC 15408) and specified Security Functional Requirements.

For example, the trusted operating system 109 may be configured with a "secure boot sequence". In the secure boot sequence, instructions of the trusted operating system 109 can be divided into several (i.e. a plurality of) different operating system instruction pieces. Each operating system instruction piece can be digitally signed. The first instruction piece that needs to be loaded into computer memory in the boot sequence can be stored in read-only-memory (ROM). Each instruction piece can include instructions to verify the digital signature of the subsequent piece to be loaded into computer memory in the boot sequence. Optionally, the boot sequence may require the digital signature of each instruction piece to be verified in order for the boot sequence to complete. For example, the boot sequence can be aborted if the digital signature of one of the instruction pieces cannot be verified.

Trusted user mode processes running on the trusted OS 109 can be called trusted applications (TAs) 108. TAs 108 can be provided with additional security and verification features, to ensure greater security for the trusted OS 109. For example, the trusted applications 108 can be digitally signed with TA vendor public keys so that hacking a trusted application becomes more complex.

A secure communication channel 107 can be established between the rich OS kernel 105 and TAs 108. The rich OS kernel 105 and trusted applications 108 operating within the trusted OS 109 may communicate using the secure communication channel 107. This may allow the rich OS kernel 105 to submit requests to TAs 108 and receive replies from TAs 108.

By isolating the REE 101 and TEE 102, access control methods such as MAC and encryption key derivation for file system-level encryption may be protected against kernel hacking. The processor may be provided with CPU instructions to switch between REE 101 and TEE 102. Drivers in the rich OS 104 can be implemented to communicate with TAs 108 operating in the trusted OS 109. This may provide enhanced security for the rich OS 104 by allowing security-sensitive functions to be implemented using TAs 108, as opposed to executing in REE 101. The rich OS 104 submit requests to TAs 108 whenever security-sensitive functions need to be executed. For example, the rich OS 104 may be a mobile operating systems such as iOS and the trusted execution environment 102 may provide a secure enclave usable to provide encryption key derivation for file system-level encryption.

The computer system 100 may also include various other components that are not shown in FIG. 1. For example, computer system 100 may include one or more communication interfaces, input devices, and output devices. For example, the output devices may include a suitable display for outputting information and data as needed by various computer programs. In particular, the display may display a graphical user interface (GUI) of the rich OS 104. Various other types of output devices may also be provided, such as speakers and/or tactile feedback sensors.

Input device may enable a user to interact with the rich OS 104. For example, the computer system 100 may include one or more input devices such as a keyboard, mouse, trackpad and various other input devices.

It should also be understood that some of the elements of the computer system 100, such as some or all of the memory and/or processor may be implemented using a combination of hardware and software resources, for instances using virtual machines and/or containers.

Communication interface such as one or more wired or wireless data network interfaces may be provided to enable communication with external systems or devices and/or for communication over a network, such as a Universal Serial Bus, Bluetooth™ or Ethernet connection. Computer system 100 may at times connect to external computers or servers via the Internet. For example, the computer system 100 may connect to a software update server to obtain the latest version of a software application or firmware.

Figure 2:
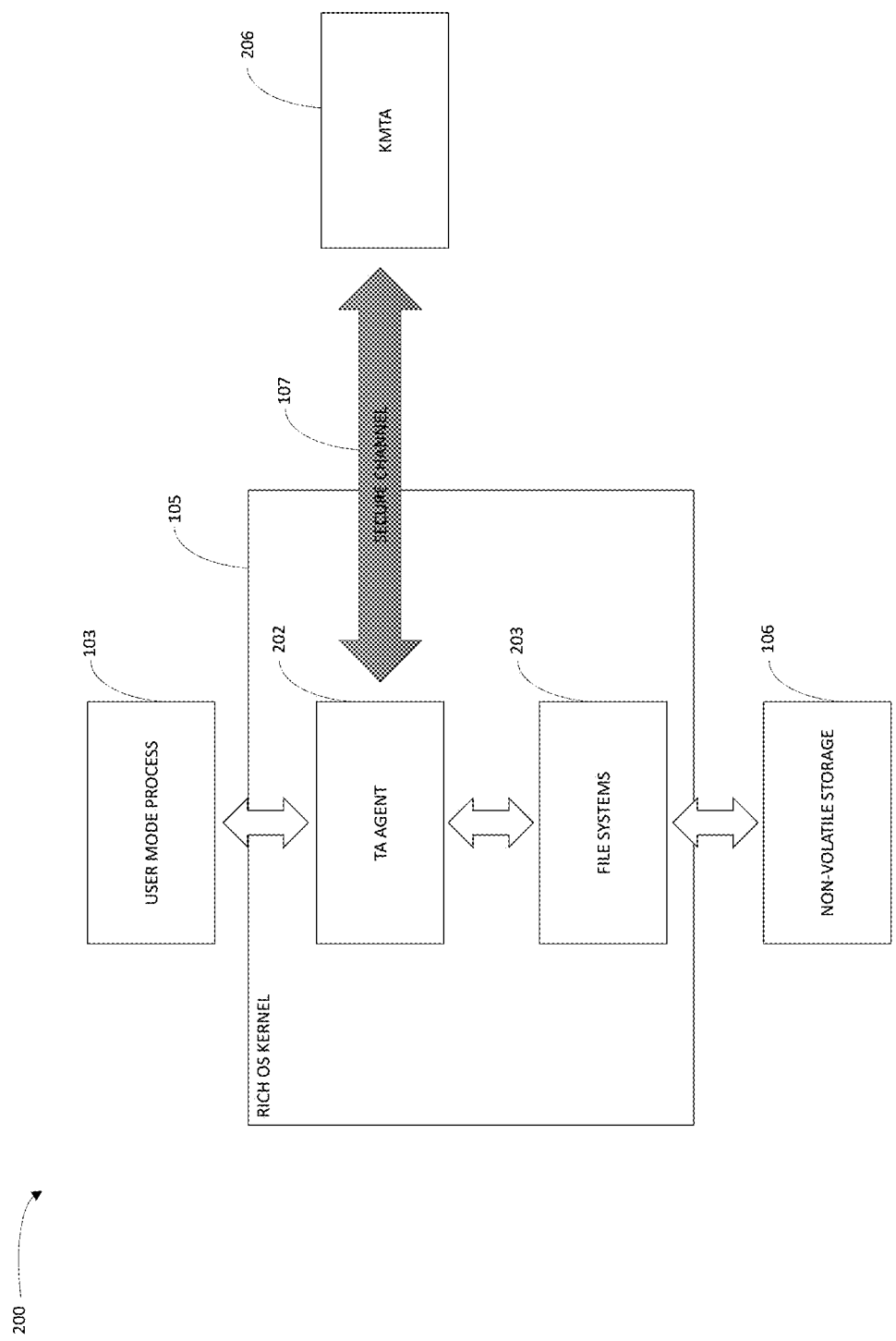
FIG. 2 is a block diagram illustrating an example of an access control system that may be used with the computer system FIG. 1 in accordance with an embodiment.

Referring now to FIG. 2, shown therein is an example of an access control system 200 that may be used in accordance with an embodiment. The access control system 200 may be implemented in a computer system such as computer system 100.

As shown in FIG. 2, the kernel 105 of the rich operating system can include file system modules 203. The file system modules 203 may be implemented using various different file system types, such as the ext4 file system and the NTFS file system for example. The file system modules 203 may be configured to implement file system-level encryption.

User mode processes 103 may transmit system calls to the kernel 105 in order to perform operations related to data files in the non-volatile storage 106. The file system modules 203 can be configured to fulfill the system call(s) and provide the user mode processes 103 with access to stored data files and/or store further data files created or modified by the user mode processes 103.

As shown in FIG. 2, the kernel 105 can include a file access monitoring module (TA agent 202). The file access monitoring module 202 may be configured to intercept system calls from the user mode process 103. When user mode processes 103 submit requests (or system calls) to the rich OS kernel 105, those requests can be intercepted by the TA agent 202 before reaching file systems 203. The file access monitoring module 202 may intercept every file request from a user mode process 103 before the request reaches the file system modules 203.

The access control system 200 can also include a trusted access monitoring application (KMTA 206) that runs on the trusted operating system. The trusted access monitoring application 206 can be configured to perform access control operations related to file requests issued to the kernel 105 of the rich operating system. The trusted access monitoring application 206 can communicate with the file access monitoring module 202 using a secure communication channel 107.

Upon receiving a request from a user mode processes 103, the file access monitoring module 202 can communicate with the trusted access monitoring application 206 through the secure channel 107. The file access monitoring module 202 can transmit file request data to the trusted access monitoring application 206 that corresponds to the intercepted request. The trusted access monitoring application 206 may evaluate the file request data to determine whether or not the request should be permitted. The trusted access monitoring application 206 can then provide a response to the file access monitoring module 202 indicating whether or not to fulfill the request. The trusted access monitoring application 206 may also provide the file access monitoring module 202 with data necessary to fulfill the request, such as an encryption key needed to decrypt an encrypted file. The file access monitoring module 202 can then interact with the requesting user mode process 103 and file system modules 203 based on the response from the trusted access monitoring application 206.

Each encrypted data file in the plurality of encrypted data files stored by the non-volatile storage memory 106 may be encrypted using a file-specific encryption key. The trusted access monitoring application 206 can be configured to determine the file-specific encryption key independently for each encrypted data file. For example, the trusted access monitoring application 206 may determine random key information for each encrypted file independently (e.g. at the time of file creation). The random key information may then be used to derive the encryption key for the corresponding file.

The access control system 200 may be configured to perform various processes and operations described herein, such as file creation processes, file opening processes, file operation processes, secret key generation processes, managing process activation records, and processes establishing a secure communication channel that are described herein below. The file access monitoring module 202 and trusted access monitoring application 206 in access control system 200 can be configured to perform various operations described herein, such as the operations described in respect of the file creation processes, file opening processes, file operation processes, secret key generation processes, managing process activation records, and processes establishing a secure communication channel.

File Creation Process

The following is a description of a file creation process that may be used by itself in any access control system or method, or in any combination or sub-combination with any other feature or features disclosed including the system architecture, the file opening process, the file operation process, the secret key generation process, the process activation records, and the secure communication channel.

Figure 3:
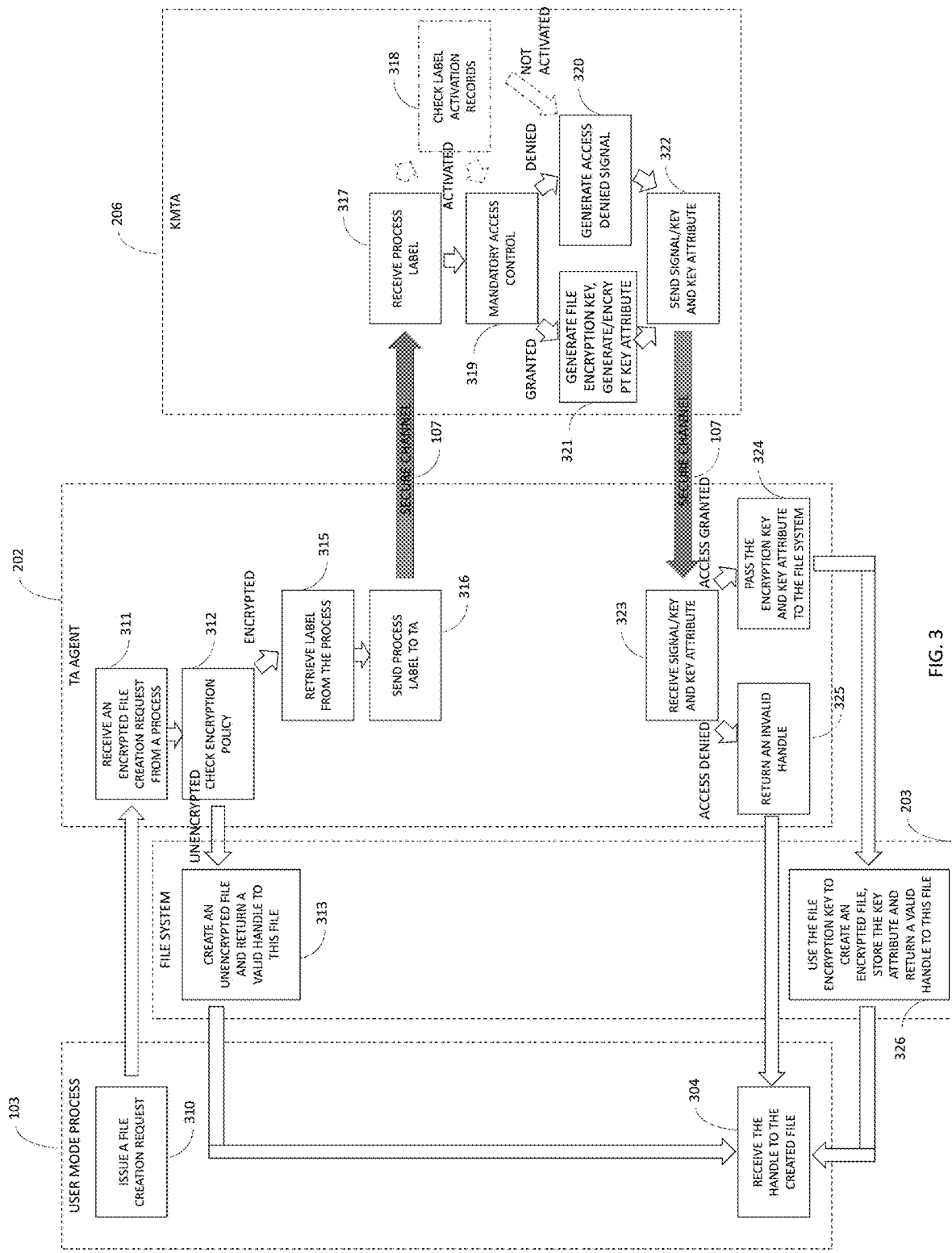
FIG. 3 is a flow diagram illustrating an example of a file creation process in accordance with an embodiment.

Referring now to FIG. 3, shown therein is an example process for creating a file in accordance with an embodiment. The process shown in FIG. 3 may be implemented using a computer system such as computer system 100 and may involve the operation of an access control system such as access control system 200.

At 310, a user mode process 103 operating in the rich operating system can create a data file (which may be an encrypted file) and send a file creation request (or system call) to the kernel of the rich operating system. For simplicity, the user mode process 103 may be referred to as a creating process.

At 311, a file access monitoring module (TA agent 202) operating in the kernel can receive the file creation request from the creating process. The TA agent 202 may intercept the file creation request prior to the file creation request reaching the file system 203.

The TA agent 202 may then determine whether the file creation request relates to creating an additional encrypted data file. For example, at 312 the TA agent 202 may evaluate a file encryption policy for the created file to determine if the file should be encrypted. If the TA agent 202 determines that the file should not be encrypted, the TA agent 202 can pass the file creation request directly to the file system 203.

At 313, the file system 203 can create a new unencrypted file based on the file creation request. The file system 203 can also return a valid handle to the unencrypted file to the user mode process 103 at 304.

Optionally, prior to creating the new unencrypted file, the file system 203 may evaluate whether the process 103 is a valid process capable of creating a new file. If the process is considered to be valid by the file system 203, only then will the new unencrypted file be generated.

If, at 312, the TA agent 203 determines that the file should be encrypted, the TA agent 203 can collect process identification data (e.g. label information) corresponding to the issuing user mode process 103 at 315. At 316, the TA agent 203 can transmit an encrypted file creation request to the trusted access monitoring application (KMTA 206). The encrypted file creation request can include the process identification data corresponding to the creating process. The TA agent 203 can transmit the encrypted file creation request using the secure channel 107.

The trusted access monitoring application 206 can receive the encrypted file creation request, include the process label information, at 317. At 319 the trusted access monitoring application 206 can apply access control polices, stored by the trusted access monitoring application, using the received process label information. The trusted access monitoring application 206 can determine whether the creating process 103 is permitted to generate the additional encrypted data file by comparing the process identification data with file creation criteria stored by the trusted access monitoring application. The file creation criteria can be stored as part of the access control polices in the trusted operating system.

If the trusted access monitoring application 206 determines that the user mode process 103 cannot create the encrypted file (i.e. the user mode process 103 is not permitted to create the encrypted file according to the access control policies) the trusted access monitoring application 206 can generate an access denied signal at 320. The trusted access monitoring application 206 can send the access denied signal to the file access monitoring module 202 at 322.

Upon receiving an access denied signal at 323, the file access monitoring module 202 can notify the user mode process 103 of an error by returning an invalid handle at 325. The file access monitoring module 202 can also prevent the user mode process 103 from creating the requested encrypted file, e.g. by preventing the request from reaching the file system modules 203.

Alternately, at 319 the trusted access monitoring application 206 can determine that the user mode process 103 can create the encrypted file (i.e. the user mode process 103 is permitted to create the encrypted file according to the access control policies). In response to determining that the creating process 103 is permitted to generate the additional encrypted data file, the trusted access monitoring application 206 can generate an access granted signal at 321.

At 321, the trusted access monitoring application 206 can also generate additional file identification data for the additional encrypted data file based on the file access criteria. The trusted access monitoring application 206 can generate the file identification data as a file label using the access control policies and the process label information received as part of the file creation request.

The trusted access monitoring application 206 can also generate additional key information for the additional encrypted data file. The key information may be generated as random key information. The trusted access monitoring application 206 may then generate an additional encryption key for the additional encrypted data file using the additional key information.

The trusted access monitoring application 206 can also define file access data (e.g. a key attribute) using the additional file identification data (e.g. the newly created file label) and the additional key information.

At 322, the trusted access monitoring application 206 can transmit the file access data and the encryption key to the file access monitoring module 202.

Optionally, the trusted access monitoring application 206 can encrypt the file access data prior to sending the file access data to the trusted access monitoring application 206. At 321, the trusted access monitoring application 206 can generate additional encrypted file access data by encrypting the file access data using a secret access key stored by the trusted access monitoring application 206. The secret access key may be only available to the trusted access monitoring application 206.

The trusted access monitoring application 206 may then transmit the additional encryption key and the additional encrypted file access data to file access monitoring module 202 at 322. This may allow the file access data to be stored in association with the newly created encrypted file, without allowing any components of the rich operating system (including to file access monitoring module 202) to access the file access data in a plaintext format.

In response to receiving an access granted signal at 323 (along with the additional encryption key and the additional encrypted file access data), the file access monitoring module 202 can provide the additional encryption key and the additional encrypted file access data to a file system 203 of the rich operating system at 324. The file access monitoring module 202 can pass the encryption key and the key attribute to the underlying file system modules 203 to which the file creation request was initially directed.

At 326, the file system 203 can use the additional encryption key to generate the additional encrypted data file. The file system 203 can also store the additional encrypted data file in the non-voltage storage memory 106. The file system 203 can also store the additional encrypted file access data in the non-voltage storage memory 106 in association with the additional encrypted data file, e.g. as a file attribute. The file system 203 can also return a valid handle to the encrypted file to the user mode process 103 at 304.

Optionally, prior to creating the new encrypted file, the file system 203 may evaluate whether the process 103 is a valid process capable of creating a new file. If the process is considered to be valid by the file system 203, only then will the new unencrypted file be generated.

Optionally, the secret access key used by the trusted access monitoring application 206 to encrypt the file access data at 321 may be made available to the trusted access monitoring application 206 only after valid user credentials are received. For example, a user may be prompted to type in the user's credentials in response to the file access monitoring module intercepting the file creation request. Examples of secret key generation processes that may be used with the process shown in FIG. 3 are described in further detail herein below.

Optionally, after receiving the process label from the file access monitoring module 202 at 317, the trusted access monitoring application 206 may also check if the process label has been activated at 318. The trusted access monitoring application 206 may check if the process label has been activated prior to evaluating the file access criteria at 319. The trusted access monitoring application 206 may only proceed to 321 if the process label has been activated.

If the trusted access monitoring application 206 determines at 318 that the process label is not activated, the trusted access monitoring application 206 may move directly to 320 and generate an access denied signal. If the trusted access monitoring application 206 determines at 318 that the process label is activated, the trusted access monitoring application 206 can continue to apply access control policies at 319, and the whole procedure can then resume. Examples of processes involving process activation records that may be used with the process shown in FIG. 3 are described in further detail herein below.

File Opening Process

The following is a description of a file opening process that may be used by itself in any access control system or method, or in any combination or sub-combination with any other feature or features disclosed including the system architecture, the file creation process, the file operation process, the secret key generation process, the process activation records, and the secure communication channel.

Figure 4:
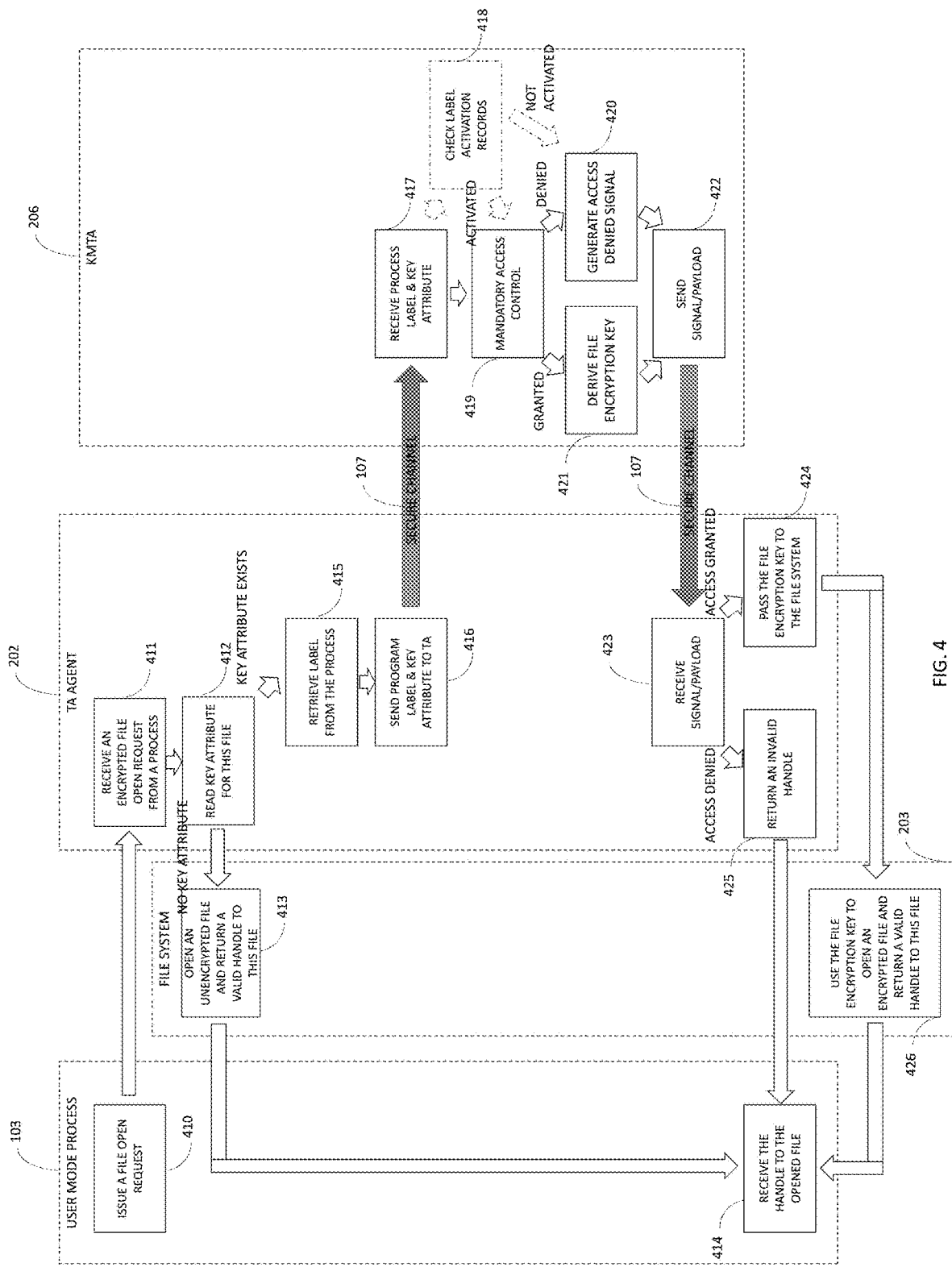
FIG. 4 is a flow diagram illustrating an example of a file opening process in accordance with an embodiment.

Referring now to FIG. 4, shown therein is an example process for opening a file in accordance with an embodiment. The process shown in FIG. 4 may be implemented using a computer system such as computer system 100 and may involve the operation of an access control system such as access control system 200.

At 410, a requesting user mode process operating on the rich operating system can transmit a file open request (i.e. a system call) to the kernel. The file open request can identify a requested data file stored in the non-volatile storage memory 106 that the requesting process is attempting to access.

At 411, the file access monitoring module 202 can receive the file request from the requesting process. The file access monitoring module 202 can intercept the file request before the file request reaches the file system 203. The file access monitoring module 202 can thus ensure that the requesting process can be vetted prior to being granted access to the requested file.

At 412, the file access monitoring module 202 may evaluate the requested file to determine whether the requested file is an encrypted data file. For example, the file access monitoring module 202 may evaluate metadata associated with the requested file or determine whether a key attribute (i.e. key information) is associated with the requested file to determine whether the requested file is encrypted. If the key attribute does not exist, the file access monitoring module 202 can pass the file request to the file system 203.

At 413, the file system 203 can evaluate the file request. If the file system 203 determines that the file request is valid, the file system 203 can open the unencrypted file and return a valid handle to the requested file to the requesting user mode process 103 at 414.

When the file access monitoring module 202 determines at 412 that the requested file is an encrypted data file (e.g. a key attribute is present or metadata indicates that the file is encrypted), at 415 the file access monitoring module 202 can collect process identification data (e.g. process label information) associated with the requesting process 103.

At 416, the file access monitoring module 202 can transmit file request data to the trusted access monitoring application 206. As shown, the file request data can be transmitted using a secure channel 107. The file request data can include file access data (e.g. key information and file identification data) associated with the requested file and process identification data (a process label) associated with the requesting process.

At 417, the trusted access monitoring application 206 can receive the file request data from the file access monitoring module 202.

The trusted access monitoring application 206 can then determine file identification data associated with the requested file from the file access data included in the file request data. The trusted access monitoring application 206 may also determine key information from the file access data.

At 419, the trusted access monitoring application 206 can exercise access control polices based on the process label information and the file label information included in the file request data. The trusted access monitoring application 206 can determine whether the requesting process is permitted to access the requested file by comparing the file identification data (determined at 417) and the process identification data with file access criteria stored by the trusted access monitoring application 206.

Optionally, the file access data included in the file request data may be encrypted using a secret access key stored by the trusted access monitoring application 206. In this case, at 419 the trusted access monitoring application 206 can determine the secret access key associated with the requested file. The trusted access monitoring application 206 can then decrypt the encrypted file access data using the secret access key determining the file access data as the decrypted file access data. The decrypted file access data can then be used to evaluate whether the requesting process is permitted to access the requested file.

If, at 419, the trusted access monitoring application 206 determines that the requesting process is not permitted to access the requested encrypted file, the trusted access monitoring application 206 can generate an access denied signal at 420. At 422, the trusted access monitoring application 206 can transmit the access denied signal to the file access monitoring module 202.

Upon receiving an access denied signal at 423, the file access monitoring module 202 can notify the requesting user mode process 103 of an error by returning an invalid handle at 425. The file access monitoring module 202 can prevent the requesting process 103 from accessing the requested file, e.g. by preventing the system call from being passed to the file system 203.

If, at 419, the trusted access monitoring application 206 determines that the requesting process is permitted to access the requested encrypted file, the trusted access monitoring application 206 can generate an access granted signal at 421. The trusted access monitoring application 206 can also derive an encryption key corresponding to the requested file. For example, the trusted access monitoring application 206 may derive the encryption key corresponding to the requested file using key information included as part of the file access data.

Optionally, each encrypted data file in the plurality of encrypted data files is encrypted using a file-specific encryption key. The trusted access monitoring application 206 may derive the file-specific encryption key independently for each encrypted data file.

At 422, the trusted access monitoring application 206 can transmit the encryption key to the file access monitoring module 202. The trusted access monitoring application 206 can send the encryption key along with the access granted signal.

In response to receiving the encryption key, the file access monitoring module 202 can decrypt the requested file using the encryption key, and provide the decrypted file to the requesting process For example, upon receiving an access granted signal and encryption key at 423, the file access monitoring module 202 can pass the encryption key to the underlying file system 203 at 424. At 426, the file system 203 may then use the encryption key to open the file and return a valid handle to the file to the requesting process 103 at 414. Optionally, the file system 203 may further evaluate the file request at 426 to determine whether the request is considered valid according to file system criteria.

Optionally, the secret access key used by the trusted access monitoring application 206 to decrypt the key attribute at 419 may be made available to the trusted access monitoring application 206 only after valid user credentials are received. For example, a user may be prompted to type in the user's credentials in response to the file access monitoring module 202 intercepting the file request. Examples of secret key generation processes that may be used with the process shown in FIG. 4 are described in further detail herein below.

Optionally, after receiving the process label (i.e. the process identification data of the requesting process) from the file access monitoring module 202 at 417, the trusted access monitoring application 206 may also check if the process label has been activated at 418. The trusted access monitoring application 206 may check if the process label has been activated prior to evaluating the file access criteria at 419. The trusted access monitoring application 206 may only proceed to 421 if the process label has been activated.

If the trusted access monitoring application 206 determines at 418 that the process label is not activated, the trusted access monitoring application 206 may move directly to 420 and generate an access denied signal. If the trusted access monitoring application 206 determines at 418 that the process label is activated, the trusted access monitoring application 206 can continue to apply access control policies at 419, and the whole procedure can then resume. Examples of processes involving process activation records that may be used with the process shown in FIG. 4 are described in further detail herein below.

File Operation Process

The following is a description of a file operation process that may be used by itself in any access control system or method, or in any combination or sub-combination with any other feature or features disclosed including the system architecture, the file creation process, the file opening process, the secret key generation process, the process activation records, and the secure communication channel.

Figure 5:
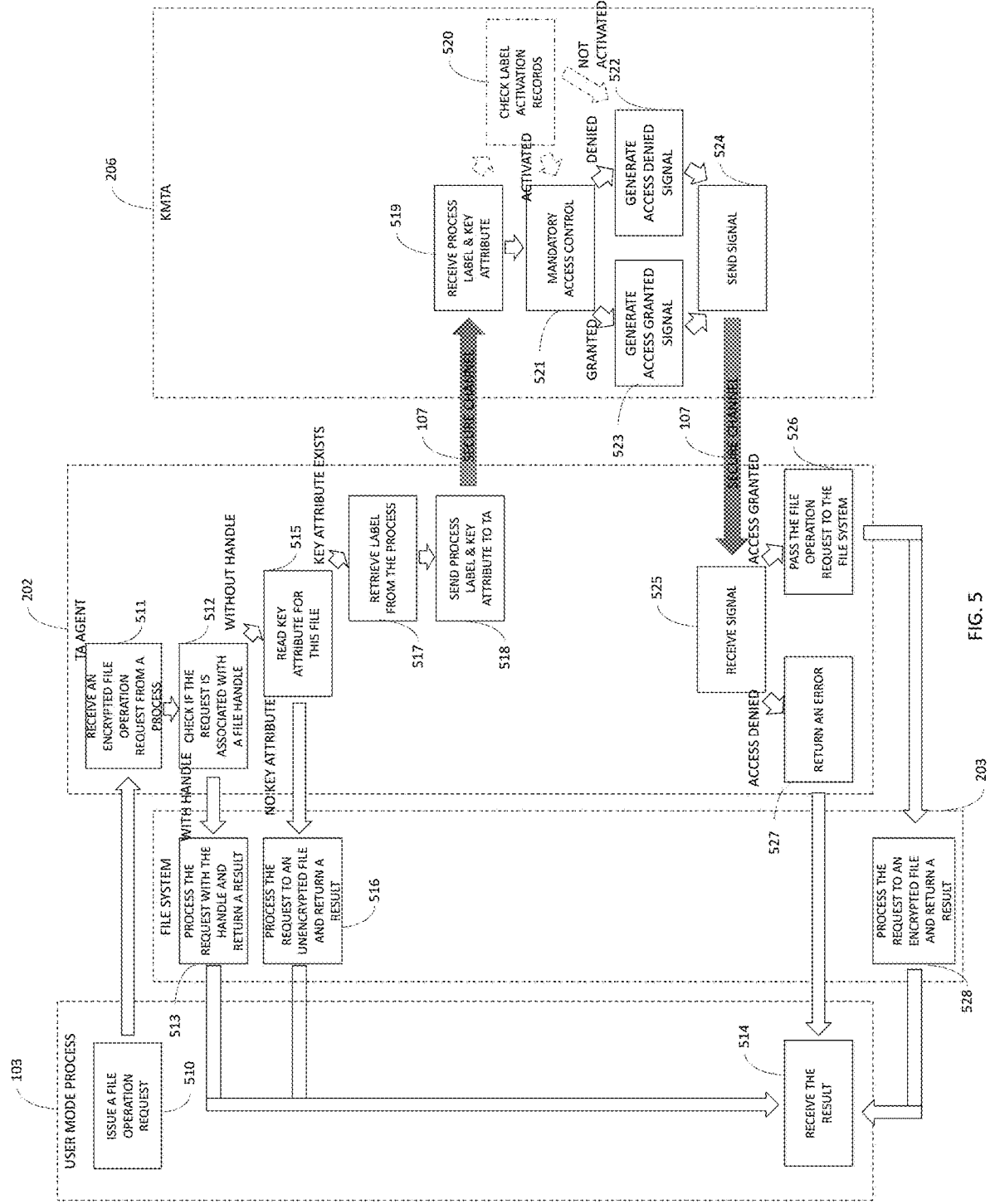
FIG. 5 is a flow diagram illustrating an example of a file operation process in accordance with an embodiment.

Referring now to FIG. 5, shown therein is an example process for performing a file operation (other than creating a file or opening a file) in accordance with an embodiment. The process shown in FIG. 5 may be implemented using a computer system such as computer system 100 and may involve the operation of an access control system such as access control system 200.

At 510, a requesting user mode process operating on the rich operating system can transmit a file operation request (i.e. a system call) to the kernel. The file operation request can identify a requested data file stored in the non-volatile storage memory 106 that the requesting process is attempting to access. The file operation request can also identify a requested operation that the requesting process is requesting to perform on the requested file. It should be understood that the file creation process and file open process described herein above relate to specific examples of file operations, and the example process for performing a file operation described herein below relates more generally to performing any other operations on a requested file.

At 511, the file access monitoring module 202 can receive the file operation request from the requesting process. The file access monitoring module 202 can intercept the file request before the file request reaches the file system 203. The file access monitoring module 202 can thus ensure that the requesting process can be vetted prior to being granted access to the requested file.

At 512, the file access monitoring module 202 may evaluate the requested file to determine whether the requested file is associated with a file handle. This may indicate whether the requested file is already being accessed by a process operating in the rich operating system (such as the requesting process). If the requested file is associated with a file handle, the file access monitoring module 202 can pass the file request to the file system 203.

At 513, the file system 203 can process the request and return a result of the requested operation to the requesting user mode process 103. Optionally, the file system 203 can evaluate the file request at 513 prior to returning the result. If the file system 203 determines that the file request is valid, then the file system 203 can perform the operation and return the result. The requesting user mode process 103 can receive the result at 514.

If at 512 the file access monitoring module 202 determines that the requested file is not associated with a file handle, the process proceeds to 515.

At 515, the file access monitoring module 202 may evaluate the requested file to determine whether the requested file is an encrypted data file. For example, the file access monitoring module 202 may evaluate metadata associated with the requested file or determine whether a key attribute (i.e. key information) is associated with the requested file to determine whether the requested file is encrypted. If the key attribute does not exist, the file access monitoring module 202 can pass the file request directly to the file system 203.

At 516, the file system 203 can process the request and return a result of the requested operation to the requesting user mode process 103. Optionally, the file system 203 can evaluate the file request at 513 prior to returning the result. If the file system 203 determines that the file request is valid, then the file system 203 can perform the operation and return the result.

When the file access monitoring module 202 determines at 515 that the requested file is an encrypted data file (e.g. a key attribute is present or metadata indicates that the file is encrypted), at 517 the file access monitoring module 202 can collect process identification data (e.g. process label information) associated with the requesting process 103.

At 518, the file access monitoring module 202 can transmit file request data to the trusted access monitoring application 206. As shown, the file request data can be transmitted using a secure channel 107. The file request data can include file access data (e.g. key information and file identification data) associated with the requested file and process identification data (a process label) associated with the requesting process. The file access monitoring module 202 can include operation data associated with the requested operation in the file request data transmitted to the trusted access monitoring application 206 at 518.

At 519, the trusted access monitoring application 206 can receive the file request data from the file access monitoring module 202. The trusted access monitoring application 206 can then determine file identification data associated with the requested file from the file access data included in the file request data. The trusted access monitoring application 206 may also determine key information from the file access data.

At 521, the trusted access monitoring application 206 can exercise access control polices based on the process label information and the file label information included in the file request data. The trusted access monitoring application 206 can determine whether the requesting process is permitted to perform the requested operation on the requested file by comparing the file identification data (determined at 519), the process identification data, and the operation data with file access criteria stored by the trusted access monitoring application 206.

Optionally, the file access data included in the file request data may be encrypted using a secret access key stored by the trusted access monitoring application 206. In this case, at 521 the trusted access monitoring application 206 can determine the secret access key associated with the requested file. The trusted access monitoring application 206 can then decrypt the encrypted file access data using the secret access key determining the file access data as the decrypted file access data. The decrypted file access data can then be used to evaluate whether the requesting process is permitted to perform the requested operation on the requested file.

If, at 521, the trusted access monitoring application 206 determines that the requesting process is not permitted to perform the requested operation on the requested file, the trusted access monitoring application 206 can generate an operation denied signal at 522. At 524, the trusted access monitoring application 206 can transmit the operation denied signal to the file access monitoring module 202.

Upon receiving an operation denied signal at 525, the file access monitoring module 202 can notify the requesting user mode process 103 of an error by returning an access denied error at 527. The file access monitoring module 202 can prevent the requesting process 103 from performing the requested operation, e.g. by preventing the system call from being passed to the file system 203.

If, at 521, the trusted access monitoring application 206 determines that the requesting process is permitted to perform the requested operation on the requested encrypted file, the trusted access monitoring application 206 can generate an operation granted signal at 523. The trusted access monitoring application 206 can also derive an encryption key corresponding to the requested file. For example, the trusted access monitoring application 206 may derive the encryption key corresponding to the requested file using key information included as part of the file access data.

Optionally, each encrypted data file in the plurality of encrypted data files is encrypted using a file-specific encryption key. The trusted access monitoring application 206 may derive the file-specific encryption key independently for each encrypted data file.

At 524, the trusted access monitoring application 206 can transmit the operation granted signal to the file access monitoring module 202. The trusted access monitoring application 206 can also transmit the encryption key along with the access granted signal.

In response to receiving the encryption key, the file access monitoring module 202 can provide the decrypted file to the requesting process 103 to enable the requested operation. The file access monitoring module 202 can decrypt the requested file using the encryption key, and provide the decrypted file to the requesting process.

For example, upon receiving an operation granted signal and encryption key at 525, the file access monitoring module 202 can pass the encryption key to the underlying file system 203 at 526. At 528, the file system 203 may then use the encryption key to open the file and return a result of the operation to the requesting process 103. Optionally, the file system 203 may further evaluate the file request at 528 to determine whether the request is considered valid according to file system criteria.

Optionally, the secret access key used by the trusted access monitoring application 206 to decrypt the key attribute at 521 may be made available to the trusted access monitoring application 206 only after valid user credentials are received. For example, a user may be prompted to type in the user's credentials in response to the file access monitoring module 202 intercepting the file operation request. Examples of secret key generation processes that may be used with the process shown in FIG. 5 are described in further detail herein below.

Optionally, after receiving the process label (i.e. the process identification data of the requesting process) from the file access monitoring module 202 at 519, the trusted access monitoring application 206 may also check if the process label has been activated at 520. The trusted access monitoring application 206 may check if the process label has been activated prior to evaluating the file access criteria at 521. The trusted access monitoring application 206 may only proceed to 523 if the process label has been activated.

If the trusted access monitoring application 206 determines at 520 that the process label is not activated, the trusted access monitoring application 206 may move directly to 522 and generate an access denied signal. If the trusted access monitoring application 206 determines at 520 that the process label is activated, the trusted access monitoring application 206 can continue to apply access control policies at 521, and the whole procedure can then resume. Examples of processes involving process activation records that may be used with the process shown in FIG. 5 are described in further detail herein below.

Secret Key Generation Process

The following is a description of a secret key generation process that may be used by itself in any access control system or method, or in any combination or sub-combination with any other feature or features disclosed including the system architecture, the file creation process, the file opening process, the file operation process, the process activation records, and the secure communication channel.

In some cases, the file access data that is included in a file request transmitted from the file access monitoring module 202 to the trusted access monitoring application 206 may be encrypted file access data. This encrypted file access data may be encrypted using a secret access key stored by the trusted access monitoring application 206. That is, the secret access key may be available only to the trusted access monitoring application 206—i.e. not available within the rich execution environment (even to the file access monitoring module 202). This may ensure that the file access data remains encrypted while it is present within the rich execution environment.

The trusted access monitoring application 206 may be configured to determine the file access data from the received file request data by determining the secret access key associated with the requested file. Once the secret access key is determined, the encrypted file access data can be decrypted using the secret access key and the file access data can be determined as the decrypted file access data.

The secret access key may be generated only in response to receiving valid user credentials from a user of the computer system. This may ensure that file access is controlled on a user-specific basis.

The trusted access monitoring application 206 may determine the secret access key using the user credentials. For example, the secret access key may be stored by the trusted access monitoring application 206 as an encrypted access key. The encryption key used to generate the encrypted access key may be derived using the user credentials, e.g. using a hashed form of the user credentials. The trusted access monitoring application 206 may then determine the secret access key by decrypting the encrypted access key using the user credentials.

The trusted access monitoring application 206 may receive the user credentials from a user mode process operating in the rich operating system. The user credentials may be provided to the trusted access monitoring application 206 via the file access monitoring module. In some cases, user credentials may be solicited each time that the trusted access monitoring application 206 attempts to decrypt file access data.

Figure 6:
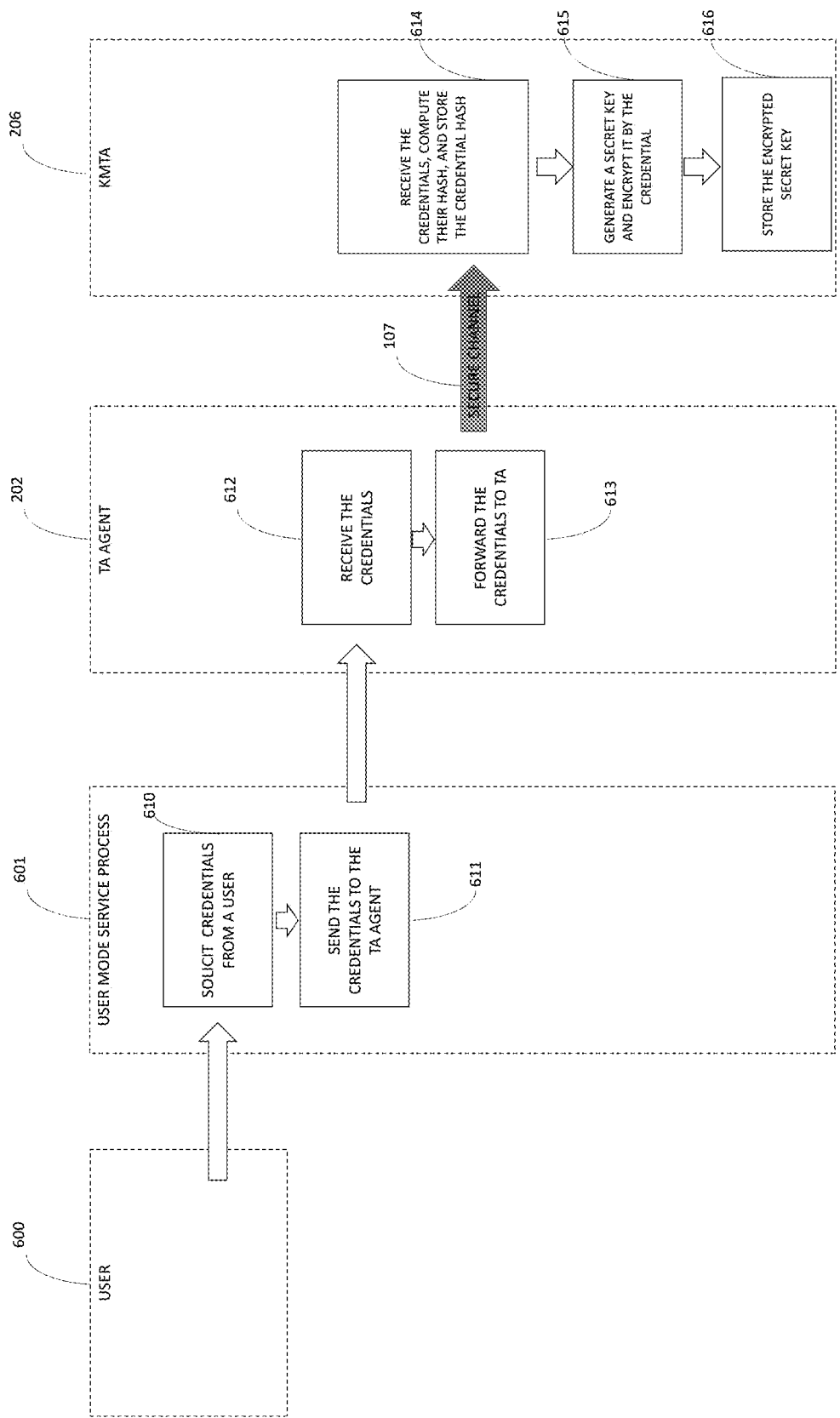
FIG. 6 is a flow diagram illustrating an example of a secret key generation process in accordance with an embodiment.

Referring now to FIG. 6, shown therein is an example process for generating a secret access key in accordance with an embodiment. The process shown in FIG. 6 may be implemented using a computer system such as computer system 100 and may involve the operation of an access control system such as access control system 200. The process shown in FIG. 6 may be used with various other processes described herein, such as for use in encrypting/decrypting key attributes during a file opening/creation/operation process for example.

At 610, a user mode service process 601 can solicit credentials from a user 600. For example, the user mode service process 601 can provide an input prompt (e.g. a pop-up window) to initiate the solicitation of credentials from the user. The user 600 can then provide the credentials using an input device, such as a keyboard or biometric device (e.g. fingerprint scanner, retinal scanner, or facial recognition device).

For example, the user mode service process 601 may solicit credentials during an initial login procedure of the computer system. Alternately or in addition, the user mode service process 601 may solicit credentials in response to a file request intercepted by the file access monitoring module 202. For example, the user mode service process 601 may solicit credentials in response to every file request intercepted by the file access monitoring module 202 that relates to an encrypted file.

At 611, the user mode service process 601 can transmit the user credentials received at 610 to the file access monitoring module 202. The file access monitoring module 202 can receive the user credentials at 612. The file access monitoring module 202 can then forward the user credentials to the trusted access monitoring application 206 at 613. As shown, the user credentials can be transmitted from the file access monitoring module 202 to the trusted access monitoring application 206 using a secure channel 107.

At 614, the trusted access monitoring application 206 can receive the user credentials from the file access monitoring module 202. The trusted access monitoring application 206 can then determine hashed credentials by computing a hash of the received user credentials. The hashed credentials can then be stored by the trusted access monitoring application 206 within the trusted execution environment.

At 615, the trusted access monitoring application 206 can generate a secret access key. The trusted access monitoring application 206 can generate the secret access key randomly. The trusted access monitoring application 206 can then encrypt the secret access key using the user's credentials. The encrypted secret access key can be stored by the trusted access monitoring application 206 in non-volatile storage within the trusted execution environment at 616.

In some cases, the trusted access monitoring application 206 may maintain the secret access key and/or user credentials within volatile memory temporarily for use with various processes described herein, such as the file creation, file opening, and file operation processes described herein above. The trusted access monitoring application 206 may flush the secret access key and user credentials from memory once the evaluation for which the user credentials were solicited has been completed.

Figure 7:
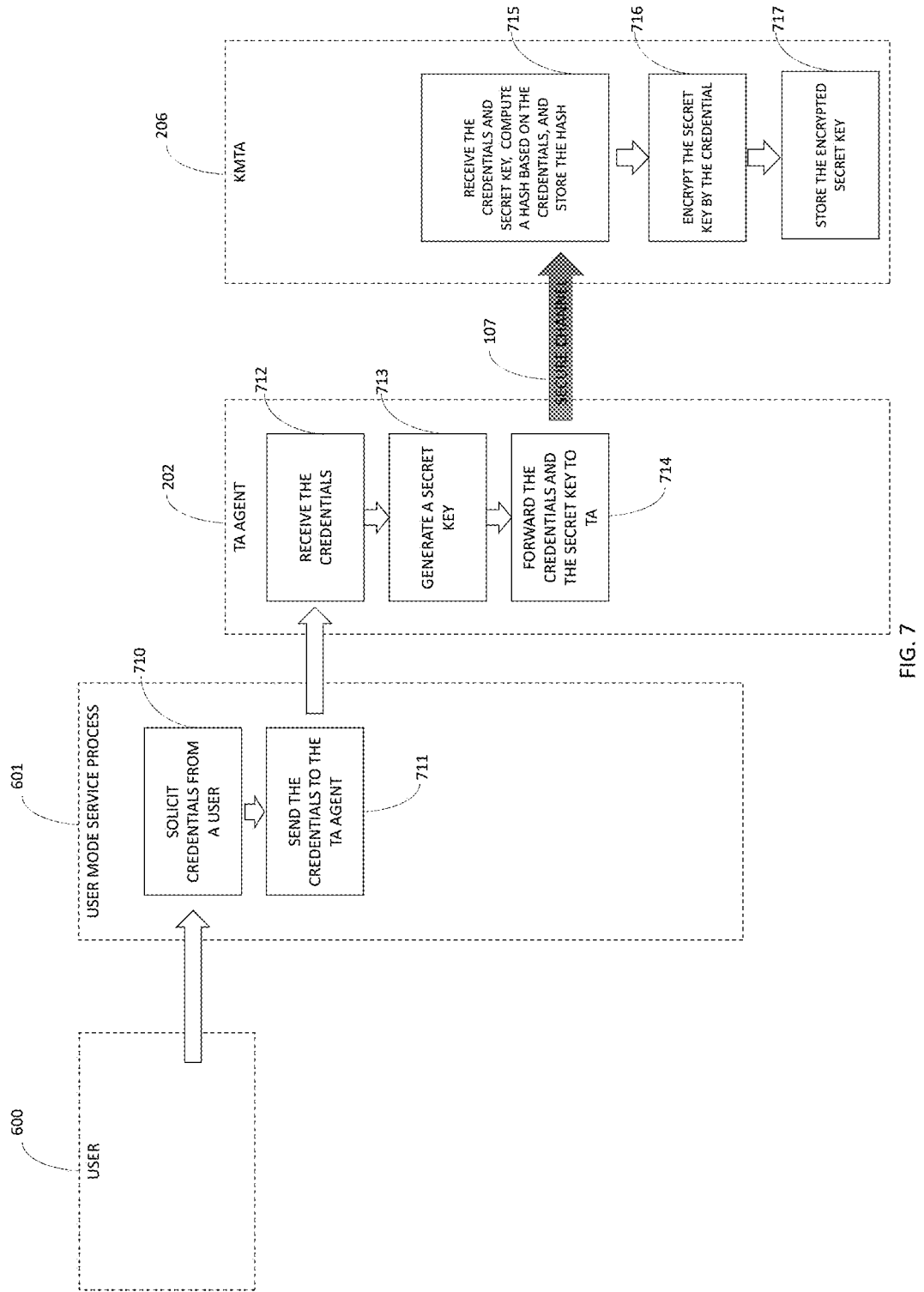
FIG. 7 is another flow diagram illustrating another example of a secret key generation process in accordance with an embodiment.

Referring now to FIG. 7, shown therein is another example process for generating a secret access key in accordance with an embodiment. The process shown in FIG. 7 may be implemented using a computer system such as computer system 100 and may involve the operation of an access control system such as access control system 200. The process shown in FIG. 7 may be used with various other processes described herein, such as for use in encrypting/decrypting key attributes during a file opening/creation/operation process for example.

At 710, a user mode service process 601 can solicit credentials from a user 600. For example, the user mode service process 601 can provide an input prompt (e.g. a pop-up window) to initiate the solicitation of credentials from the user. The user 600 can then provide the credentials using an input device, such as a keyboard or biometric device (e.g. fingerprint scanner, retinal scanner, or facial recognition device).

For example, the user mode service process 601 may solicit credentials during an initial login procedure of the computer system. Alternately or in addition, the user mode service process 601 may solicit credentials in response to a file request intercepted by the file access monitoring module 202. For example, the user mode service process 601 may solicit credentials in response to every file request intercepted by the file access monitoring module 202 that relates to an encrypted file.

At 711, the user mode service process 601 can transmit the user credentials received at 710 to the file access monitoring module 202. The file access monitoring module 202 can receive the user credentials at 712. In response to receiving the user's credentials, the file access monitoring module 202 can generate a secret access key at 713. The file access monitoring module 202 can generate the secret access key randomly.

At 714, the file access monitoring module 202 can transmit the user credentials and the secret access key to the trusted access monitoring application 206. As shown, the user credentials can be transmitted from the file access monitoring module 202 to the trusted access monitoring application 206 using a secure channel 107.

At 715, the trusted access monitoring application 206 can receive the user credentials and the secret access key from the file access monitoring module 202. The trusted access monitoring application 206 can then determine hashed credentials by computing a hash of the received user credentials. The hashed credentials can then be stored by the trusted access monitoring application 206 within the trusted execution environment.

At 716, the trusted access monitoring application 206 can encrypt the secret access key using the user's credentials. The encrypted secret access key can be stored by the trusted access monitoring application 206 in non-volatile storage within the trusted execution environment at 717.

In some cases, the trusted access monitoring application 206 may maintain the secret access key and/or user credentials within volatile memory temporarily for use with various processes described herein, such as the file creation, file opening, and file operation processes described herein above. The trusted access monitoring application 206 may flush the secret access key and user credentials from memory once the evaluation for which the user credentials were solicited has been completed.

Figure 8:
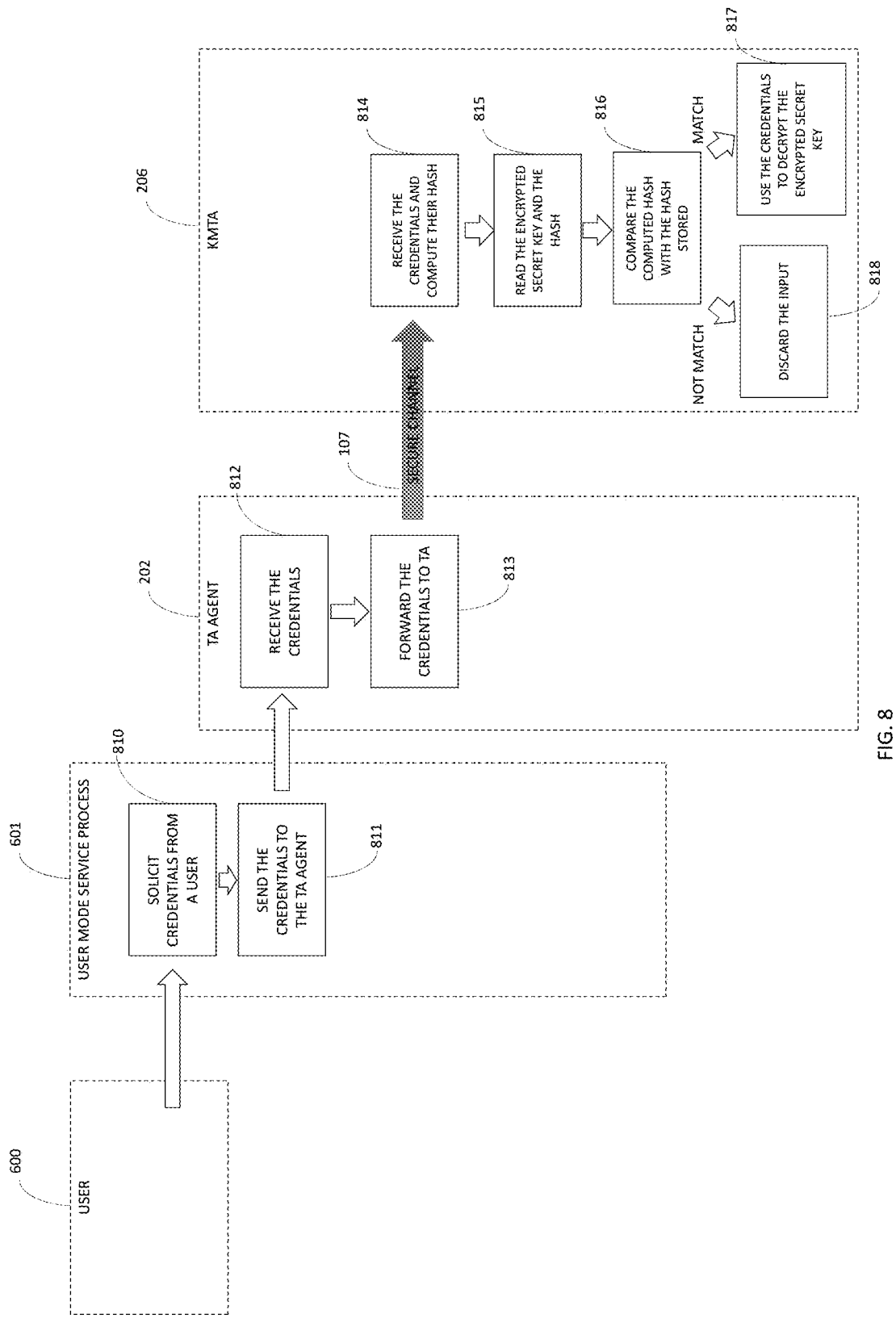
FIG. 8 is another flow diagram illustrating another example of a secret key generation process in accordance with an embodiment.

Referring now to FIG. 8, shown therein is an example process for determining a secret access key in accordance with an embodiment. The process shown in FIG. 8 may be implemented using a computer system such as computer system 100 and may involve the operation of an access control system such as access control system 200. The process shown in FIG. 8 may be used with various other processes described herein, such as for use in encrypting/decrypting key attributes during a file opening/creation/operation process for example, as well as with the processes described herein above for generating a secret access key.

At 810, a user mode service process 601 can solicit credentials from a user 600. For example, the user mode service process 601 can provide an input prompt (e.g. a pop-up window) to initiate the solicitation of credentials from the user. The user 600 can then provide the credentials using an input device, such as a keyboard or biometric device (e.g. fingerprint scanner, retinal scanner, or facial recognition device).

For example, the user mode service process 601 may solicit credentials in response to a file request intercepted by the file access monitoring module 202. The user credentials may then be used to decrypt a secret access key required to evaluate the file request.

At 811, the user mode service process 601 can transmit the user credentials received at 810 to the file access monitoring module 202. The file access monitoring module 202 can receive the user credentials at 812. The file access monitoring module 202 can then forward the user credentials to the trusted access monitoring application 206 at 813. As shown, the user credentials can be transmitted from the file access monitoring module 202 to the trusted access monitoring application 206 using a secure channel 107.

At 814, the trusted access monitoring application 206 can receive the user credentials from the file access monitoring module 202. The trusted access monitoring application 206 can then determine hashed credentials by computing a hash of the received user credentials.

At 815, the trusted access monitoring application 206 can read the stored hashed credentials from the non-volatile storage accessible to the trusted access monitoring application 206 in the trusted execution environment.

At 816, the trusted access monitoring application 206 can compare the stored hashed credentials with the hashed credentials calculated at 814. If the hashes do not match, at 818 the trusted access monitoring application 206 can discard the credentials received at 814. Optionally, the trusted access monitoring application 206 may also return an invalid credentials signal (e.g. an access denied signal or operation denied signal) to the file access monitoring module 202 indicating that the credentials are not valid.

If the hashes match at 816, at 817 the trusted access monitoring application 206 can use the credentials to decrypt the encrypted secret key. As shown in FIG. 8, the encrypted secret key may be read from the non-volatile storage accessible to the trusted access monitoring application 206 in the trusted execution environment at 815. Alternately, the encrypted secret key may be read only following a determination that the hashes match.

Process Activation Records

The following is a description of process activation records that may be used by itself in any access control system or method, or in any combination or sub-combination with any other feature or features disclosed including the system architecture, the file creation process, the file opening process, the file operation process, the secret key generation process, and the secure communication channel.

The trusted access monitoring application 206 may be configured to maintain an activation record of processes that are active and operating on the rich operating system. The activation record can include active process identification data associated with each user-specific process operating on the rich operating system. The trusted access monitoring application 206 may determine that a requesting process is permitted to access the requested file only when the activation record includes active process identification data associated with the requesting process.

The activation record may be defined to include only processes that have been validated by user credentials solicited from a user of the computer system. This may ensure that each process making a file request has been authenticated by a user of the computer system.

The activation record may be updated in response to a process being activated or deactivated within the rich operating system. When a new process (i.e. a process not currently listed in the activation record) is operating on the rich operating system (e.g. is being initialized or beginning operation), the file access monitoring module 202 can transmit a process initiation/activation message to the trusted access monitoring application 206 in response to determining that the new user-specific process is operating on the rich operating system. The process initiation message can include process identification data (e.g. the process label) associated with the new user-specific process.

The process initiation message can be generated in response to receiving valid user credentials from a user of the computer system. This may ensure that the new process is a validly operating process that is vetted (at least superficially) by a user of the computer system. The user credentials can be solicited from the user following a determination that the new user-specific process is operating on the rich operating system.

When a process ceases operation (or is about to cease operation), the file access monitoring module 202 can transmit a process termination/deactivation message to the trusted access monitoring application 206. The process termination message can be generated by the file access monitoring module 202 in response to determining that a particular user-specific process is no longer operating on the rich operating system. The trusted access monitoring application 206 can then update the activation record to remove the corresponding process identification data.

Figure 9:
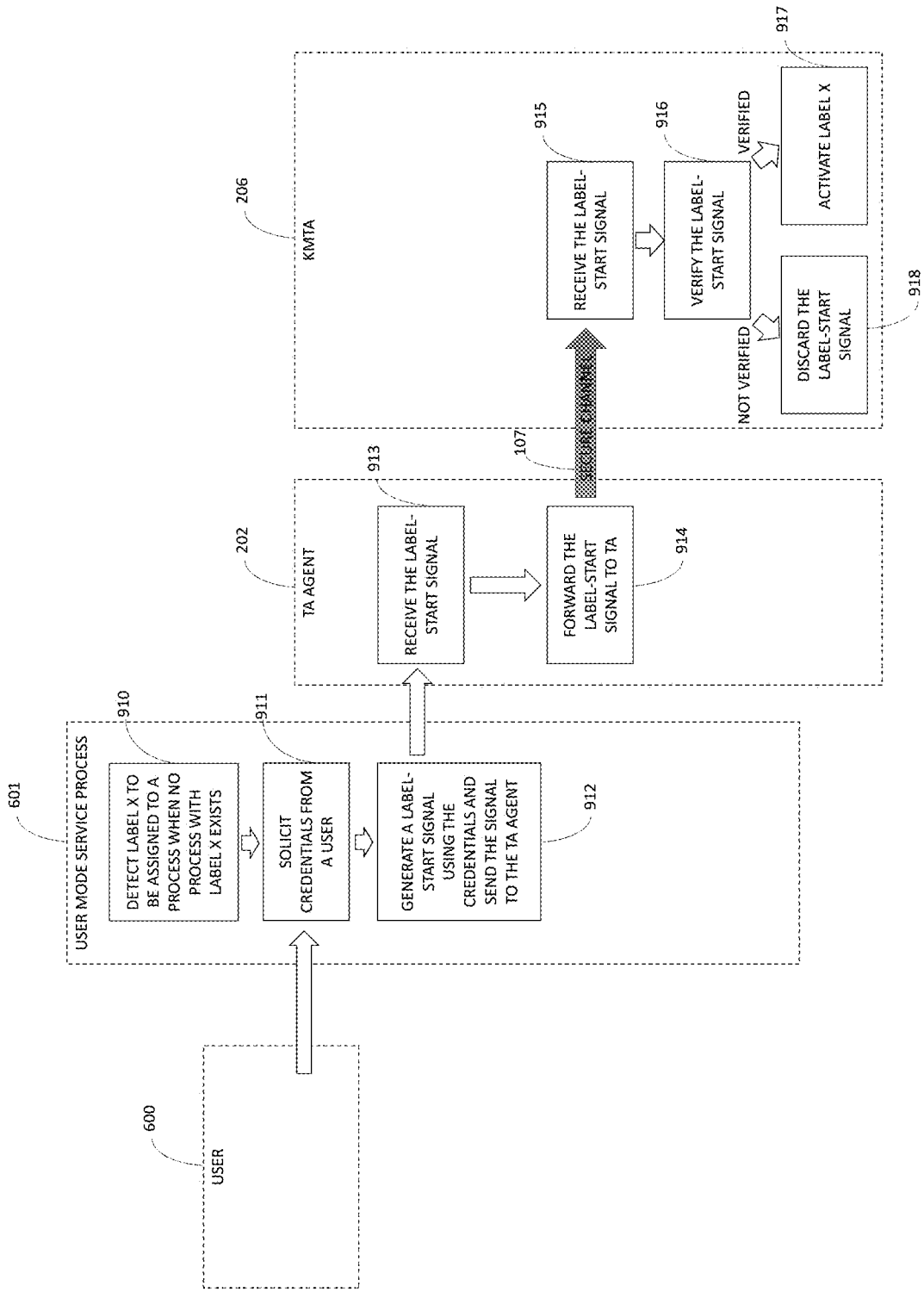
FIG. 9 is a flow diagram illustrating an example of a process for updating an activation record in accordance with an embodiment.

Referring now to FIG. 9, shown therein is an example process for updating an activation record by activating a process label in accordance with an embodiment. The process shown in FIG. 9 may be implemented using a computer system such as computer system 100 and may involve the operation of an access control system such as access control system 200. The process shown in FIG. 9 may be used with various other processes described herein, such as for use in determining whether a file request is permitted to proceed during a file opening/creation/operation process for example.

At 910, a user mode service process 601 can determine that a new process is operational, or becoming operational, within the rich operating system. For example, the user mode service process 601 can detect a new process label that is to be assigned to a new process when no process with that new process label currently exists.

At 911, the user mode service process 601 can solicit credentials from a user 600 in response to determining that the new process is operational. For example, the user mode service process 601 can provide an input prompt (e.g. a pop-up window) to initiate the solicitation of credentials from the user. The user 600 can then provide the credentials using an input device, such as a keyboard or biometric device (e.g. fingerprint scanner, retinal scanner, or facial recognition device).

At 912, the service process 601 can generate a process initiation message. The process initiation message can be generated using the credentials received at 911 and process identification data (e.g. the new process label) associated with the new process. For example, the process initiation message can be defined (or formed) to include the credentials and process identification data. As another example, the process initiation message can be defined (or formed) to include process identification data digitally signed by the hashed credentials. The service process 601 can transmit the process initiation message to the file access monitoring module 202.

At 913, the file access monitoring module 202 can receive the process initiation message. At 914, the file access monitoring module 202 can then forward the process initiation message to the trusted access monitoring application 206. As shown, the process initiation message can be transmitted to the trusted access monitoring application 206 using a secure channel 107.

At 915, the trusted access monitoring application 206 can receive the process initiation message. The trusted access monitoring application 206 can then update the activation record to include the active process identification data associated with the new user-specific process.

As shown in the example of FIG. 9, prior to adding the active process identification data associated with the new user-specific process to the activation record, the trusted access monitoring application 206 can verify the process initiation message.

At 916, the trusted access monitoring application 206 can use the user credentials received in the process initiation message to verify the process initiation message. Example process such as those described with respect to FIGS. 6, 7 and 8 may be used to validate the process initiation message with user credentials stored by the trusted access monitoring application 206.

For example, the trusted access monitoring application 206 may have stored hashed user credentials in the non-volatile storage memory accessible within the trusted execution environment. To verify the process initiation message, the trusted access monitoring application 206 may use the stored hashed user credentials. For example, the trusted access monitoring application 206 may receive the credentials from the process initiation message and compute a hashed version of the received credentials. The trusted access monitoring application 206 can compare the hashed version of the received credentials with the stored hashed credentials. As another example, the trusted access monitoring application 206 may extract the process identification data from the process initiation message. The trusted access monitoring application 206 can compute the digital signature of the extracted process identification data using the stored hashed credentials. The trusted access monitoring application 206 can then compare the computed digital signature with the digital signature of the process identification data in the process initiation message.

Alternately, the trusted access monitoring application 206 may have the user credentials stored in plaintext (e.g. in volatile memory or even in non-volatile memory in some cases). The trusted access monitoring application 206 may then use the stored user credentials to verify the process initiation message. For example, the trusted access monitoring application 206 may receive the credentials from the process initiation message and then compare the received credentials with the stored version. As another example, the trusted access monitoring application 206 can hash the stored user credentials and use the hashed credentials to compute the digital signature of the process identification data extracted from the process initiation message. The trusted access monitoring application 206 can then compare the computed digital signature with the digital signature of the process identification data in the process initiation message.

If the process initiation message is verified, the trusted access monitoring application 206 can update the activation record to include the active process identification data associated with the new user-specific process at 917. If the result of the verification at 916 is that the process initiation message is not verified, the trusted access monitoring application 206 does not update the activation record. The trusted access monitoring application 206 may discard the process initiation message 918. Optionally, the trusted access monitoring application 206 may provide an error message to the file access monitoring module 202 indicating that valid credentials were not received.

Figure 10:
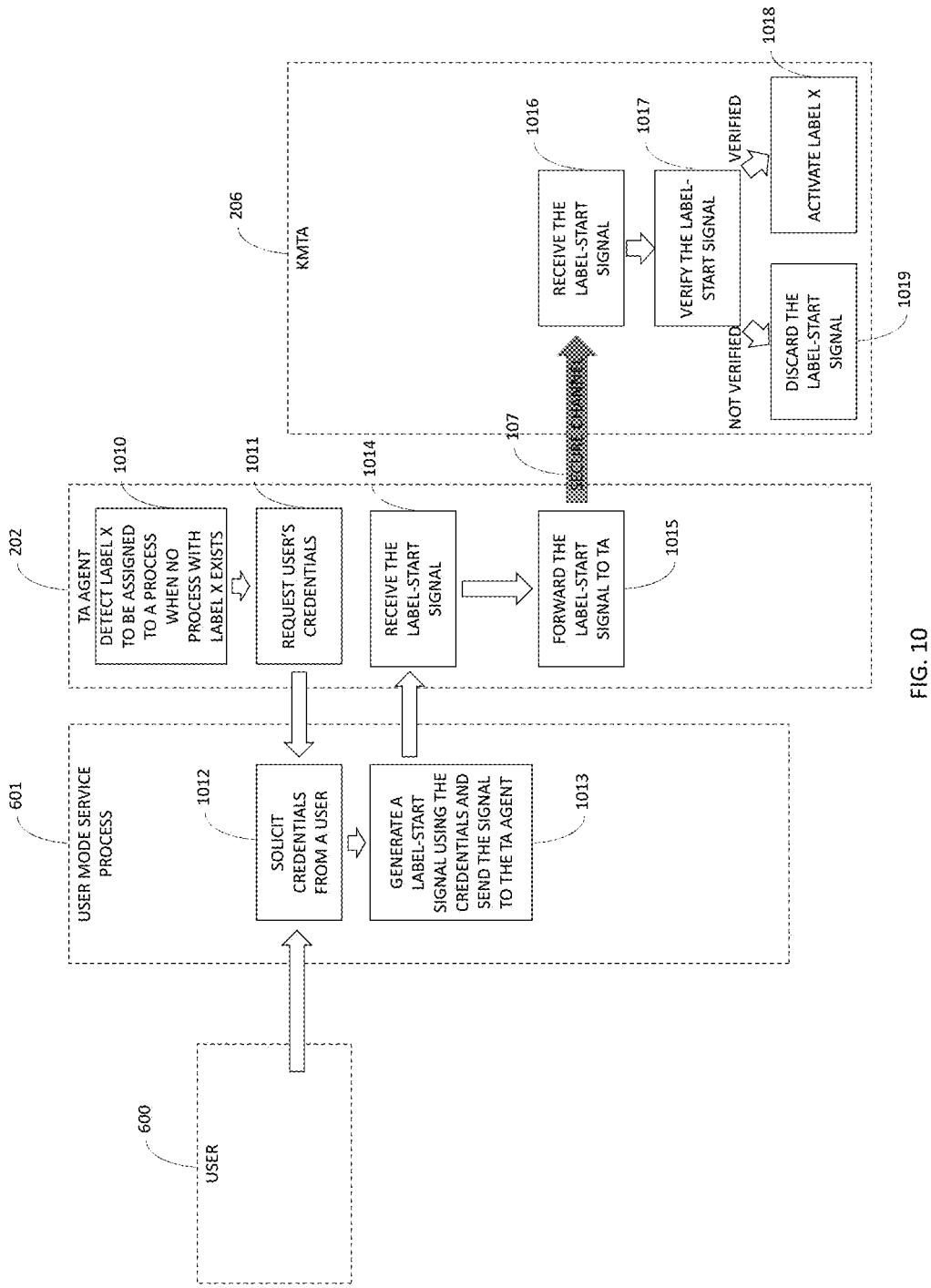
FIG. 10 is another flow diagram illustrating another example of a process for updating an activation record in accordance with an embodiment.

Referring now to FIG. 10, shown therein is another example process for updating an activation record by activating a process label in accordance with an embodiment. The process shown in FIG. 10 may be implemented using a computer system such as computer system 100 and may involve the operation of an access control system such as access control system 200. The process shown in FIG. 10 may be used with various other processes described herein, such as for use in determining whether a file request is permitted to proceed during a file opening/creation/operation process for example.

At 1010, the file access monitoring module 202 can determine that a new process is operational, or becoming operational, within the rich operating system. For example, the file access monitoring module 202 can detect a new process label that is to be assigned to a new process when no process with that new process label currently exists.

At 1011, the file access monitoring module 202 can transmit a credential request to a user mode service process 601. The credential request may indicate that user credentials are required by the file access monitoring module 202.

At 1012, the user mode service process 601 can solicit credentials from a user 600 in response to the credential request received at 1011. For example, the user mode service process 601 can provide an input prompt (e.g. a pop-up window) to initiate the solicitation of credentials from the user. The user 600 can then provide the credentials using an input device, such as a keyboard or biometric device (e.g. fingerprint scanner, retinal scanner, or facial recognition device).

At 1013, the service process 601 can generate a process initiation message. The process initiation message can be generated using the credentials received at 1012 and process identification data (e.g. the new process label) associated with the new process. For example, the process initiation message can be defined (or formed) to include the received credentials and process identification data. As another example, the process initiation message can be defined (or formed) to include process identification data digitally signed by the received credentials. The service process 601 can transmit the process initiation message to the file access monitoring module 202.

At 1014, the file access monitoring module 202 can receive the process initiation message. At 1015, the file access monitoring module 202 can then forward the process initiation message to the trusted access monitoring application 206. As shown, the process initiation message can be transmitted to the trusted access monitoring application 206 using a secure channel 107.

At 1016, the trusted access monitoring application 206 can receive the process initiation message. The trusted access monitoring application 206 can then update the activation record to include the active process identification data associated with the new user-specific process.

As shown in the example of FIG. 10, prior to adding the active process identification data associated with the new user-specific process to the activation record, the trusted access monitoring application 206 can verify the process initiation message.

At 1017, the trusted access monitoring application 206 can use the user credentials received in the process initiation message to verify the process initiation message. Example process such as those described with respect to FIGS. 6, 7 and 8 may be used to validate the process initiation message with user credentials stored by the trusted access monitoring application 206.

For example, the trusted access monitoring application 206 may have stored hashed user credentials in the non-volatile storage memory accessible within the trusted execution environment. To verify the process initiation message, the trusted access monitoring application 206 may use the stored hashed user credentials. For example, the trusted access monitoring application 206 may receive the credentials from the process initiation message. The trusted access monitoring application 206 may compute a hashed version of the received credentials and then compare the hashed version of the received credentials with the stored hashed credentials. As another example, the trusted access monitoring application 206 may extract the process identification data from the process initiation message. The trusted access monitoring application 206 may then compute the digital signature of the extracted process identification data using the stored hashed credentials and compare the computed digital signature with the digital signature of the process identification data in the process initiation message.

Alternately, the trusted access monitoring application 206 may have the user credentials stored in plaintext (e.g. in volatile memory or even in non-volatile memory in some cases). The trusted access monitoring application 206 may then use the stored user credentials to verify the process initiation message. For example, the trusted access monitoring application 206 may receive the credentials from the process initiation message and then compare the received credentials with the stored version. As another example, the trusted access monitoring application 206 can hash the stored user credentials and use the hash credentials to compute the digital signature of the process identification data extracted from the process initiation message. The trusted access monitoring application 206 can then compare the computed digital signature with the digital signature of the process identification data in the process initiation message.

If the process initiation message is verified, the trusted access monitoring application 206 can update the activation record to include the active process identification data associated with the new user-specific process at 1018. If the result of the verification at 1017 is that the process initiation message is not verified, the trusted access monitoring application 206 does not update the activation record. The trusted access monitoring application 206 may discard the process initiation message at 1019. Optionally, the trusted access monitoring application 206 may provide an error message to the file access monitoring module 202 indicating that valid credentials were not received.

Figure 11:
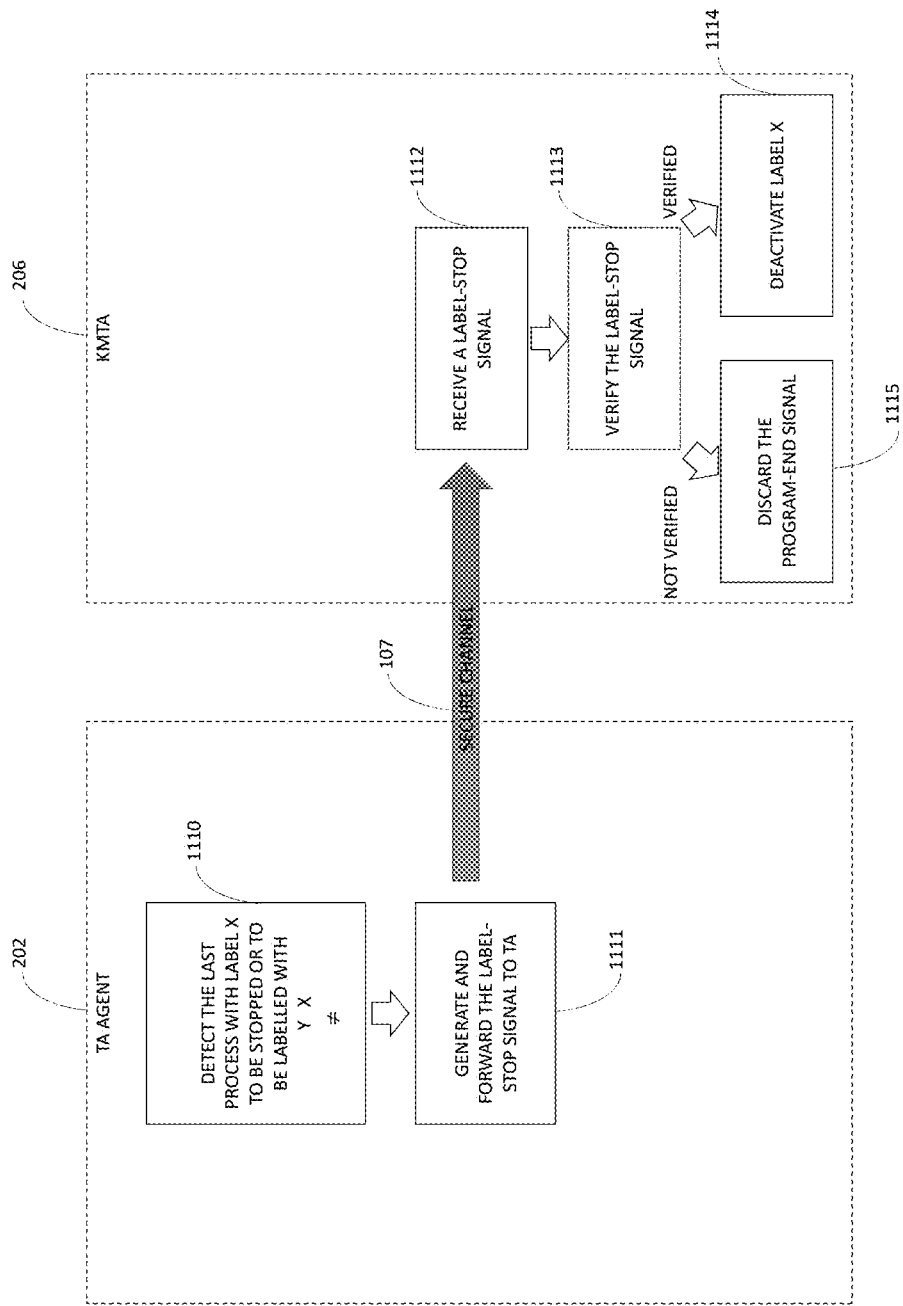
FIG. 11 is another flow diagram illustrating an example of a process for updating an activation record in accordance with an embodiment.

Referring now to FIG. 11, shown therein is an example process for updating an activation record by deactivating a process label in accordance with an embodiment. The process shown in FIG. 11 may be implemented using a computer system such as computer system 100 and may involve the operation of an access control system such as access control system 200. The process shown in FIG. 11 may be used with various other processes described herein, such as for use in determining whether a file request is permitted to proceed during a file opening/creation/operation process for example.

At 1110, the file access monitoring module 202 can determine that a particular user-specific process is no longer operating on the rich operating system. The file access monitoring module 202 may determine that the particular user-specific process is no longer operating by determining that the process with particular process identification data is to be stopped or to be labelled within different process identification data.

At 1111, the file access monitoring module 202 can generate a process termination message in response to determining at 1110 that a particular user-specific process is no longer operating on the rich operating system. The file access monitoring module 202 may generate the process termination message when the particular user-specific process is associated with active process identification data included on the activation record. The process termination message can then be generated to include the active process identification data with the particular user-specific process.

The file access monitoring module 202 can transmit the process termination message to the trusted access monitoring application 206. As shown, the process termination message can be transmitted using a secure channel 107.

At 1112, the trusted access monitoring application 206 can receive the process termination message. The trusted access monitoring application 206 can then update activation record to remove the active process identification data associated with the particular user-specific process.

As shown in the example of FIG. 10, prior to removing the active process identification data associated with the particular user-specific process from the activation record, the trusted access monitoring application 206 can verify the process termination message.

At 1113, the trusted access monitoring application 206 can use the user credentials received in the process termination message to verify the process initiation message. Example process such as those described with respect to FIGS. 6, 7 and 8 may be used to validate the process termination message with user credentials stored by the trusted access monitoring application 206.

For example, the trusted access monitoring application 206 may have stored a hashed user credential in the non-volatile storage memory accessible within the trusted execution environment. To verify the process termination message, the trusted access monitoring application 206 may compute a hashed version of the received credentials and then compare the hashed version of the received credentials with the stored hashed credentials.

Alternately, the trusted access monitoring application 206 may have the user credentials stored in plaintext (e.g. in volatile memory or even in non-volatile memory in some cases). The trusted access monitoring application 206 may then compare the received credentials with the stored version to verify the process initiation message.

If the process termination message is verified, the trusted access monitoring application 206 can update the activation record to remove the active process identification data associated with the particular user-specific process at 1114. If the result of the verification at 1113 is that the process termination message is not verified, the trusted access monitoring application 206 does not update the activation record. The trusted access monitoring application 206 may discard the process termination message 1115. Optionally, the trusted access monitoring application 206 may provide an error message to the file access monitoring module 202 indicating that valid credentials were not received.

Secure Communication Channel

The following is a description of a secure communication channel that may be used by itself in any access control system or method, or in any combination or sub-combination with any other feature or features disclosed including the system architecture, the file creation process, the file opening process, the file operation process, the secret key generation process, and the process activation records.

As shown in FIG. 2, the file access monitoring module 202 and the trusted access monitoring application 206 may be configured to communicate using a secure communication channel 107. The secure communication channel may be established by the processor of the computer system during a boot procedure of the rich operating system and the trusted operating system.

The secured communication channel may be established over an unsecured communication channel. For example, the file access monitoring module 202 and the trusted access monitoring application 206 may each store a shared communication channel key. This shared communication channel key can be used by the file access monitoring module 202 and the trusted access monitoring application 206 to secure messages transmitted therebetween, even when an unsecured channel is used, in effect establishing a secure communication channel.

Figure 12:
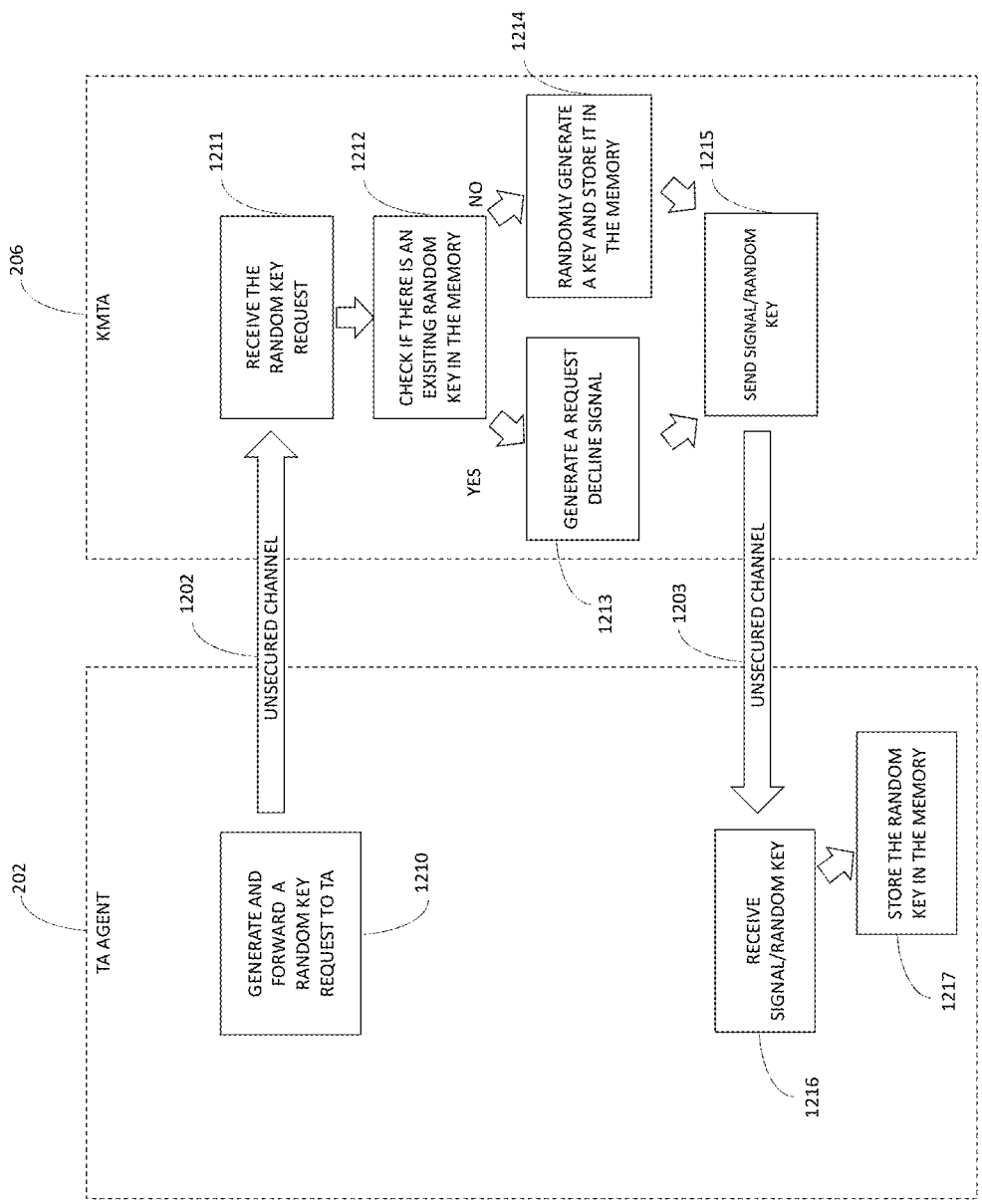
FIG. 12 is a flow diagram illustrating an example of a process for generating a shared communication channel key in accordance with an embodiment.

Referring now to FIG. 12, shown therein is an example process for establishing a shared communication channel key through an unsecured channel in accordance with an embodiment. The process shown in FIG. 12 may be implemented using a computer system such as computer system 100 and may involve the operation of an access control system such as access control system 200. The process shown in FIG. 12 may be used with various other processes described herein, such as a file opening/creation/operation process for example.

At 1210, the file access monitoring module 202 can generate a channel key request. The channel key request may be a request for a random key. The file access monitoring module 202 can transmit the channel key request to the trusted access monitoring application 206. As shown in the example of FIG. 12, the channel key request can be transmitted through an unsecured channel 1202.

At 1211, the trusted access monitoring application 206 can receive the channel key request. At 1212, the trusted access monitoring application 206 may check whether an existing communication channel key is stored in memory within the trusted execution environment.

If an existing communication channel key is detected, the trusted access monitoring application 206 can generate a request declined signal at 1213. The trusted access monitoring application 206 can transmit the request declined signal to the file access monitoring module 202 at 1215. As shown in FIG. 12, the request declined signal can be transmitted using unsecured channel 1203.

If an existing communication channel key is not detected, the trusted access monitoring application 206 can generate a communication channel key at 1214. The communication channel key may be generated randomly by the trusted access monitoring application 206. The trusted access monitoring application 206 can then store the communication channel key in memory within the trusted operation system. The communication channel key may be stored in volatile memory only. The communication channel key can be discarded every time the computer system powers down (e.g. due to the volatile memory losing power).

The trusted access monitoring application 206 can then transmit the communication channel key to the file access monitoring module 202 at 1215. As shown in FIG. 12, the communication channel key can be transmitted using unsecured channel 1203. The trusted access monitoring application 206 may only transmit the communication channel key to the file access monitoring module 202 in response to the key request that was used to generate the communication channel key—that is, the trusted access monitoring application 206 may not transmit the communication channel key to the rich execution environment in response to any other requests received from the rich execution environment.

At 1216, the file access monitoring module 202 can receive the communication channel key. The file access monitoring module 202 can then store the communication channel key in memory at 1217. The communication channel key may be stored in volatile memory only. The communication channel key can be discarded every time the computer system powers down (e.g. due to the volatile memory losing power).

The computer system 100 can be configured to implement the process shown in FIG. 12 during the booting procedure of the rich OS 104 and the trusted OS 109. For example, the process shown in FIG. 12 may be implemented each time the rich OS 104 and the trusted OS 109 are rebooted.

In the example process illustrated in FIG. 12, only one random communication channel key may be generated by the trusted access monitoring application 206 each time the rich OS 104 and the trusted OS 109 are rebooted. This may prevent malicious code injected by hackers from soliciting the established communication channel key from the trusted access monitoring application 206. This may also prevent malicious code from establishing another communication channel key with the trusted access monitoring application 206 after the existing key has been established between the legitimate file access monitoring module 202 and trusted access monitoring application 206 during the booting procedure.

Figure 13:
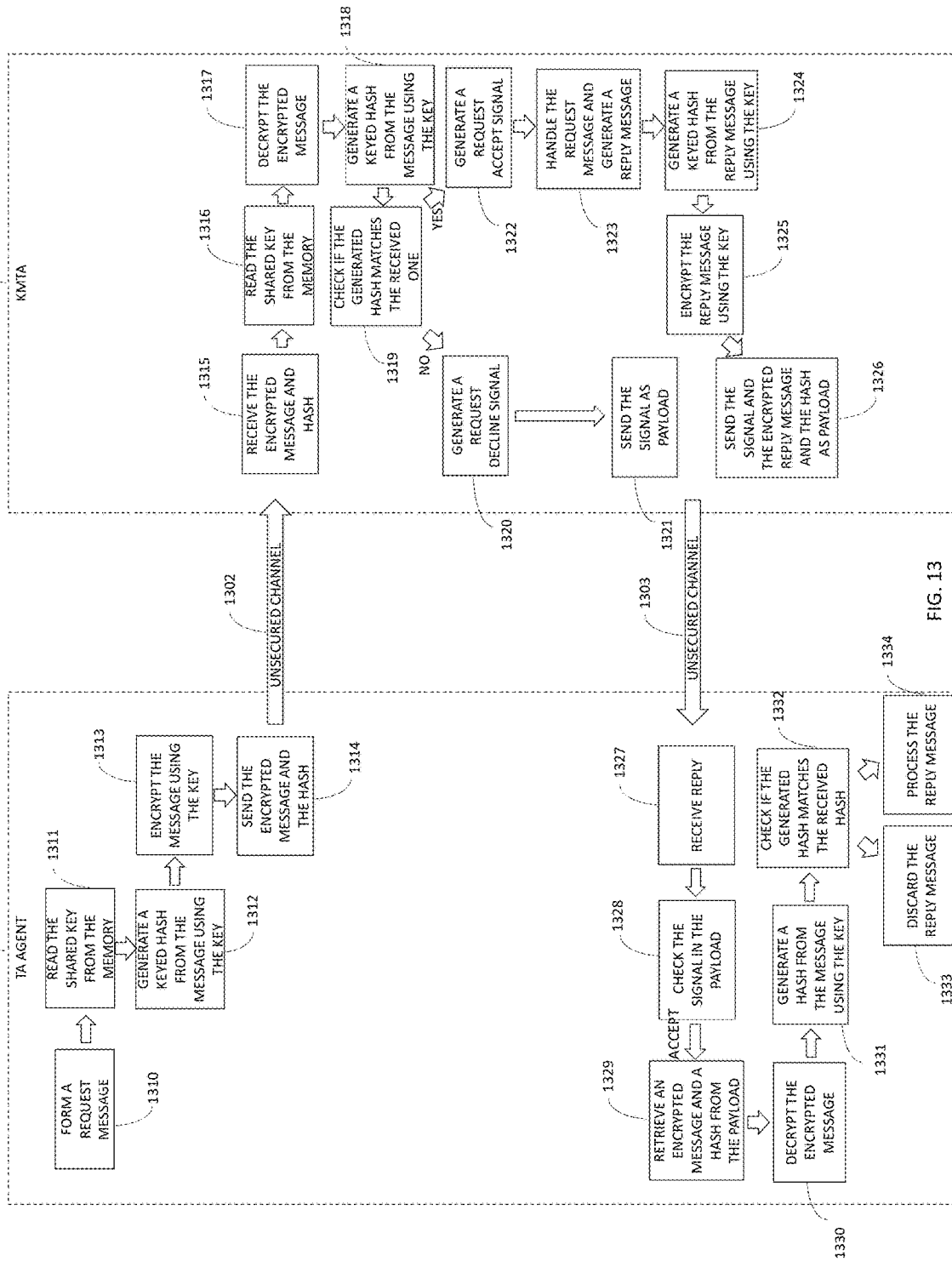
FIG. 13 is a flow diagram illustrating an example of a process for establishing a secure channel in accordance with an embodiment.

FIG. 13 shows an example process for exchanging messages in a secure manner between the file access module 202 and the trusted access monitoring application 206 through an unsecured channel in accordance with an embodiment. The process shown in FIG. 13 may be implemented using a computer system such as computer system 100 and may involve the operation of an access control system such as access control system 200. The process shown in FIG. 13 may be used with various other processes described herein, such as a file opening/creation/operation process for example.

At 1310, the file access monitoring module 202 can generate a request message. For example, the request message may be a file request message, such as a request to open a file, create a file, or perform an operation on a file as described herein above with reference to FIGS. 3-5.

At 1311, the file access monitoring module 202 can then read the shared communication channel key from memory in the rich operating system. The shared communication channel key may have been generated using a communication channel key generation process such as that described above with reference to FIG. 12.

At 1312, the file access monitoring module 202 can generate a hashed message as a keyed hash using the shared communication channel key. The file access monitoring module 202 may generate the hashed message by hashing the file request data using the shared communication channel key as the hash key.

At 1313, the file access monitoring module 202 can generate an encrypted file request message by encrypting the request message from 1310 using the shared communication channel key.

At 1314, the file access monitoring module 202 can transmit the encrypted file request message and the hashed message to the trusted access monitoring application 206. As shown in FIG. 13, the encrypted file request message (and the hashed message) can be transmitted to the trusted access monitoring application 206 using an unsecured channel 1302.

At 1315, the trusted access monitoring application 206 can receive the encrypted file request message and the hashed message. The trusted access monitoring application 206 can determine the validity of the file request message using the shared communication key stored in memory by the trusted access monitoring application 206.

At 1316, the trusted access monitoring application 206 can retrieve the stored shared communication key from memory. At 1317, the trusted access monitoring application 206 can generate a decrypted file request message by decrypting the encrypted file request message using the shared communication channel key retrieved at 1316. At 1318, the trusted access monitoring application 206 can generate a hashed decrypted message by hashing the decrypted file request message using the shared communication channel key.

At 1319, the trusted access monitoring application 206 can compare the hashed decrypted message to the hashed message received at 1315. The trusted access monitoring application 206 can determine that the received file request data is valid when the hashed decrypted message and the hashed message match.

If the trusted access monitoring application 206 determines that the file request data is not valid (e.g. the hashed decrypted message and the hashed message do not match), the trusted access monitoring application 206 can generate a request declined signal at 1320. The trusted access monitoring application 206 can transmit the request declined signal to the file access monitoring module 202 at 1321. At 1328, the file access monitoring module 202 can check the signal and determine that the request was denied. The process shown in FIG. 13 will then end. The file access monitoring module 202 may then take remedial measures, such as re-attempting the request transmission, and/or providing a user prompt indicating that the request was rejected.

If at 1319 the trusted access monitoring application 206 determines that the file request data is valid (e.g. the hashed decrypted message and the hashed message match), the trusted access monitoring application 206 can generate a request accepted signal at 1322. At 1323, the trusted access monitoring application 206 can handle the request (e.g. perform a file creation, file open, or file operation process such as described herein) and generate a reply message. Thus, the trusted access monitoring application 206 may determine that the requesting process is permitted to access/create/perform an operation on the requested file only if the received file request data is valid.

At 1324, the trusted access monitoring application 206 can generate a hashed reply message as a keyed hash using the shared communication channel key. The file access monitoring module 202 may generate the hashed reply message by hashing the reply message data using the shared communication channel key as the hash key.

At 1325, the trusted access monitoring application 206 can generate an encrypted reply message by encrypting the reply message from 1323 using the shared communication channel key.

At 1326, the trusted access monitoring application 206 can transmit the encrypted reply message and the hashed reply message to the file access monitoring module 202. As shown in FIG. 13, the encrypted reply message (and the hashed reply message) can be transmitted to the file access monitoring module 202 using an unsecured channel 1303.

At 1327, the file access monitoring module 202 can receive the encrypted reply message and the hashed reply message along with the request accepted signal. The file access monitoring module 202 can determine the validity of the reply message using the shared communication key stored in memory of the rich operating system. At 1328, the file access monitoring module 202 can check the signal and determine that the request was accepted. The process can thus proceed to 1329.

At 1329, the file access monitoring module 202 can retrieve the stored shared communication key from memory. At 1330, the file access monitoring module 202 can generate a decrypted reply message by decrypting the encrypted reply message using the shared communication channel key retrieved at 1329. At 1331, the file access monitoring module 202 can generate a hashed decrypted reply message by hashing the decrypted reply message using the shared communication channel key.

At 1332, the file access monitoring module 202 can compare the hashed decrypted reply message to the hashed reply message received at 1329. The file access monitoring module 202 can determine that the received reply message is valid when the hashed decrypted reply message and the hashed reply message match.

If the file access monitoring module 202 determines that the reply message is not valid (e.g. the hashed decrypted reply message and the hashed reply message do not match), the file access monitoring module 202 can discard the reply message at 1333. The process shown in FIG. 13 will then end. The file access monitoring module 202 may then take remedial measures, such as re-attempting the request transmission, providing a reply denied message to the trusted access monitoring application 206 and/or providing a user prompt indicating that the request was rejected.

If at 1332 the file access monitoring module 202 determines that the reply message is valid (e.g. the hashed decrypted reply message and the hashed reply message match), the file access monitoring module 202 can authenticate the reply message. The file access monitoring module 202 can process the reply message at 1334, and take further actions as required based on the contents of the reply message (e.g. passing further actions to the file system 203).

As illustrated by the example process shown in FIG. 13, a secure communication channel can be established between the file access monitoring module 202 and the trusted access monitoring application 206. This can allow the file access monitoring module 202 and the trusted access monitoring application 206 to exchange messages in a secured manner, i.e. with no parties other than the file access monitoring module 202 and the trusted access monitoring application 206 (who have the shared communication key available in memory) can interpret or modify (without being detected) messages exchanged through the secure channel.

Embodiments described herein above may enable cryptographically secure access control using a trusted execution environment. Embodiments described herein may also enable access control to be managed on a user-specific (e.g. personalized) basis using user credentials.

Systems and methods described herein may operate in a computer system equipped with a processor capable of providing at least two isolated execution environments. The isolated execution environments can include a rich execution environment and a trusted execution environment. A rich operating system can be loaded in the rich execution environment and a trusted operating system can be loaded in the trusted execution environment. An access monitoring module can be provided within the kernel of the rich operating system and a trusted access monitoring application can be provided on the trusted operating system.

File systems in the rich operating system may be configured to provide file system-level encryption. An encrypted file can be configured to include file access data (e.g. a key attribute) that contains file label information that can be used in mandatory access control and key information that may be used to derive the encryption key for the file. All key attributes may be further encrypted using a secret key, where only the trusted application has the secret key to decrypt the key attributes.

When a process (an instance of a program) submits an access request to a file, the access monitoring module inside the kernel of the rich operating system can gather label information of the process and sends the process label information together with the key attribute of the file to the trusted access monitoring application through a secure channel. Upon receiving the key attribute and the process label information, the trusted access monitoring application can decrypt the key attribute and check the file label information inside the key attribute and the process label information against access polices. The trusted access monitoring application can be configured so that only when the policies stored in the trusted access monitoring application are not violated then the trusted access monitoring application can use the key information inside the key attribute to derive an encryption key. The trusted access monitoring application can then pass the encryption key to file systems via the access monitoring module inside the kernel of the rich operating system through the secure channel.

Embodiments described herein may integrate file encryption key derivation with mandatory access control inside the trusted application, enabling mandatory access control to be cryptographically secure and force any process in the rich operating system (including kernel processes) to perform mandatory access control when accessing files. In some cases, to personalize mandatory access control, the systems and methods can include a user mode service process operable to collect credentials from a user. The secret key used to decrypt key attributes of files may be available in the trusted application only after the user's credentials are collected through the user mode service process.

The trusted application may also maintain process label activation records by soliciting credentials from the user upon a process label being assigned to a process while no process with this label exists. The trusted application can then incorporate process label activation records into mandatory access control. By maintaining process label activation based on the user's credentials and incorporating process label activation records into mandatory access control in the trusted application, mandatory access control can be personalized and may guarantee that encrypted files are accessible only after a process which is permitted to access those files according to access control policies has been launched by the user.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. In other instances, well-known methods, procedures and components have not been described in detail so as not to obscure the description of the embodiments Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

We claim:

1. An access control system comprising:
   (a) a processor configured to provide at least two isolated execution environments, wherein the at least two isolated execution environments comprise a rich execution environment and a trusted execution environment, and the processor is configured to operate a rich operating system in the rich execution environment and a trusted operating system in the trusted execution environment, wherein a kernel of the rich operating system is configured to include a file access monitoring module and wherein a trusted access monitoring application operates on the trusted operating system; and
   (b) a non-volatile storage memory configured to store a plurality of data files, wherein the plurality of data files includes a plurality of encrypted data files;
   wherein
   the file access monitoring module is configured to:
   receive a file request for a requested file stored in the non-volatile storage memory, wherein the requested file corresponds to one of the encrypted data files in the plurality of encrypted data files, and wherein the file request is received from a requesting process operating on the rich operating system; and
   transmit file request data to the trusted access monitoring application, wherein the file request data comprises file access data associated with the requested file and process identification data associated with the requesting process;
   the trusted access monitoring application is configured to:
   receive the file request data;
   determine file identification data associated with the requested file from the file access data;
   determine whether the requesting process is permitted to access the requested file by comparing the file identification data and the process identification data with file access criteria stored by the trusted access monitoring application; and
   in response to determining that the requesting process is permitted to access the requested file:
   derive an encryption key corresponding to the requested file; and
   transmit the encryption key to the file access monitoring module; and
   the file access monitoring module is configured to, in response to receiving the encryption key, decrypt the requested file using the encryption key, and provide the decrypted file to the requesting process.

2. The access control system of claim 1, wherein each encrypted data file in the plurality of encrypted data files is encrypted using a file-specific encryption key, and the file-specific encryption key is determined independently for each encrypted data file.

3. The access control system of claim 1, wherein the file access data associated with the requested file comprises key information, and the trusted access monitoring application is configured to derive the encryption key corresponding to the requested file using the key information.

4. The access control system of claim 1, wherein
   (a) the file access data included in the file request data is encrypted file access data, wherein the encrypted file access data is encrypted using a secret access key stored by the trusted access monitoring application; and
   (b) the trusted access monitoring application is configured to determine the file access data from the received file request data by:
   (i) determining the secret access key associated with the requested file;
   (ii) decrypting the encrypted file access data using the secret access key; and
   (iii) determining the file access data as the decrypted file access data.

5. The access control system of claim 4, wherein
   (a) the trusted access monitoring application is configured to:
   (i) store the secret access key as an encrypted access key; and
   (ii) determine the secret access key by decrypting the encrypted access key.

6. The access control system of claim 5, wherein the trusted access monitoring application is configured to:
   (a) determine the secret access key by:
   (i) receiving user credentials from a user mode process operating in the rich operating system, wherein the user credentials are received via the file access monitoring module; and
   (ii) decrypt the encrypted access key using the user credentials to determine the secret access key.

7. The access control system of claim 1, wherein the file access monitoring module and the trusted access monitoring application are configured to communicate using a secure communication channel, wherein the secure communication channel is established by the processor during a boot procedure of the rich operating system and the trusted operating system.

8. The access control system of claim 7, wherein:
   (a) the file access monitoring module is configured to store a shared communication channel key corresponding to the secure communication channel;
   (b) the trusted access monitoring application is configured to store the same shared communication channel key;
   (c) the file access monitoring module is further configured to transmit the file request data to the trusted access monitoring application by:
   (i) generating an encrypted file request message by encrypting the file request data using the shared communication channel key;
   (ii) generating a hashed message by hashing the file request data using the shared communication channel key; and
   (iii) transmitting the encrypted file request message and the hashed message to the trusted access monitoring application; and
   (d) the trusted access monitoring application is further configured to:
   (i) determine a validity of the file request data by:
   generating a decrypted file request message by decrypting the encrypted file request message using the shared communication channel key;
   generating a hashed decrypted message by hashing the decrypted file request message using the shared communication channel key;
   comparing the hashed decrypted message to the hashed message; and determining that the received file request data is valid when the hashed decrypted message and the hashed message match; and
(ii) determine that the requesting process is permitted to access the requested file only if the received file request data is valid.

9. The access control system of claim 1, wherein:
(a) the file access monitoring module is configured to:
(i) receive a file creation request from a creating process operating in the rich operating system;
(ii) determine that the file creation request relates to creating an additional encrypted data file;
(iii) transmit an encrypted file creation request to the trusted access monitoring application, wherein the encrypted file creation request comprises process identification data corresponding to the creating process;
(b) the trusted access monitoring application is configured to:
(i) determine that the creating process is permitted to generate the additional encrypted data file by comparing the process identification data with file creation criteria stored by the trusted access monitoring application;
(ii) in response to determining that the creating process is permitted to generate the additional encrypted data file,
generate additional file identification data for the additional encrypted data file based on the file access criteria;
generate additional key information for the additional encrypted data file;
generate an additional encryption key for the additional encrypted data file using the additional key information;
define file access data using the additional file identification data and the additional key information;
generate additional encrypted file access data by encrypting the file access data using a secret access key stored by the trusted access monitoring application;
transmit the additional encryption key and the additional encrypted file access data to the file access monitoring module; and
(c) the file access monitoring module is further configured to:
(i) provide the additional encryption key and the additional encrypted file access data to a file system of the rich operating system, wherein the file system is operable to use the additional encryption key to generate the additional encrypted data file, and the file system is operable to store the additional encrypted data file in the non-volatile storage memory and to store the additional encrypted file access data in the non-volatile storage memory in association with the additional encrypted data file.

10. The access control system of claim 1, wherein:
(a) the file request comprises a file operation request, wherein the file operation request identifies a requested operation that the requesting process is requesting to perform on the requested file;
(b) the file access monitoring module is configured to include operation data associated with the requested operation in the file request data transmitted to the trusted access monitoring application;
(c) the trusted access monitoring application is configured to:
(i) determine whether the requesting process is permitted to perform the requested operation on the requested file by comparing the file identification data, the process identification data, and the operation data with the file access criteria stored by the trusted access monitoring application; and
(ii) in response to determining that the requesting process is permitted to perform the requested operation on the requested file, transmit an operation permitted signal to the file access monitoring module;
(iii) in response to determining that the requesting process is not permitted to perform the requested operation on the requested file, transmit an operation denied signal to the file access monitoring module;
(d) the file access monitoring module is further configured to:
(i) in response to receiving the operation permitted signal, provide the decrypted file to the requesting process to enable the requested operation; and
(ii) in response to receiving the operational denied signal, prevent the requesting process from performing the requested operation.

11. The access control system of claim 1, wherein:
(a) the trusted access monitoring application is configured to maintain an activation record of one or more user-specific processes operating on the rich operating system, wherein the activation record includes active process identification data associated with each user-specific process operating on the rich operating system;
(b) the file access monitoring module is configured to:
(i) transmit a process initiation message to the trusted access monitoring application in response to determining that a new user-specific process is operating on the rich operating system, wherein the process initiation message includes the active process identification data associated with the new user-specific process, and wherein the process initiation message is generated using valid user credentials from a user of the processor, wherein the user credentials are solicited from the user following a determination that the new user-specific process is operating on the rich operating system;
(ii) transmit a process termination message to the trusted access monitoring application in response to determining that a particular user-specific process is no longer operating on the rich operating system, wherein the particular user-specific process is associated with active process identification data included on the activation record, wherein the process termination message includes the active process identification data with the particular user-specific process; and
(c) the trusted access monitoring application is configured to
(i) in response to receiving the process initiation message, update the activation record to include the active process identification data associated with the new user-specific process;
(ii) in response to receiving the process termination message, update the activation record to remove the active process identification data associated with the particular user-specific process; and
(iii) determine that the requesting process is permitted to access the requested file only when the activation record includes active process identification data associated with the requesting process.

12. A method of controlling access to a plurality of data files stored in a non-volatile storage memory, wherein the plurality of data files includes a plurality of encrypted data files, the method performed using a processor configured to provide at least two isolated execution environments, wherein the at least two isolated execution environments comprise a rich execution environment and a trusted execution environment, and the processor is configured to operate a rich operating system in the rich execution environment and a trusted operating system in the trusted execution environment, the method comprising:
(a) operating a file access monitoring module in a kernel of the rich operating system to:
receive a file request for a requested file stored in the non-volatile storage memory, wherein the requested file corresponds to one of the encrypted data files in the plurality of encrypted data files, and wherein the file request is received from a requesting process operating on the rich operating system; and
transmit file request data to a trusted access monitoring application operating on the trusted operating system, wherein the file request data comprises file access data associated with the requested file and process identification data associated with the requesting process;
(b) operating the trusted access monitoring application to:
receive the file request data;
determine file identification data associated with the requested file from the file access data;
determine whether the requesting process is permitted to access the requested file by comparing the file identification data and the process identification data with file access criteria stored by the trusted access monitoring application; and
in response to determining that the requesting process is permitted to access the requested file:
derive an encryption key corresponding to the requested file; and
transmit the encryption key to the file access monitoring module; and
(c) operating the file access monitoring module to, in response to receiving the encryption key, decrypt the requested file using the encryption key, and provide the decrypted file to the requesting process.

13. The method of claim 12, wherein each encrypted data file in the plurality of encrypted data files is encrypted using a file-specific encryption key, and the file-specific encryption key is determined independently for each encrypted data file.

14. The method of claim 12, wherein the file access data associated with the requested file comprises key information, and the method comprises operating the trusted access monitoring application to derive the encryption key corresponding to the requested file using the key information.

15. The method of claim 12, wherein
(a) the file access data included in the file request data is encrypted file access data, wherein the encrypted file access data is encrypted using a secret access key stored by the trusted access monitoring application; and
(b) the method comprises operating the trusted access monitoring application to determine the file access data from the received file request data by:
(i) determining the secret access key associated with the requested file;
(ii) decrypting the encrypted file access data using the secret access key; and
(iii) determining the file access data as the decrypted file access data.

16. The method of claim 15, further comprising:
(a) operating the trusted access monitoring application to:
(i) store the secret access key as an encrypted access key; and
(ii) determine the secret access key by decrypting the encrypted access key.

17. The method of claim 16, further comprising operating the trusted access monitoring application to:
(a) determine the secret access key by:
(i) receiving user credentials from a user mode process operating in the rich operating system, wherein the user credentials are received via the file access monitoring module; and
(ii) decrypt the encrypted access key using the user credentials to determine the secret access key.

18. The method of claim 12, further comprising:
(a) establishing a secure communication channel during a boot procedure of the rich operating system and the trusted operating system; and
(b) operating the file access monitoring module and the trusted access monitoring application to communicate using the secure communication channel.

19. The method of claim 18, further comprising:
(a) operating the file access monitoring module to store a shared communication channel key corresponding to the secure communication channel;
(b) operating the trusted access monitoring application to store the same shared communication channel key;
(c) operating the file access monitoring module to transmit the file request data to the trusted access monitoring application by:
(i) generating an encrypted file request message by encrypting the file request data using the shared communication channel key;
(ii) generating a hashed message by hashing the file request data using the shared communication channel key; and
(iii) transmitting the encrypted file request message and the hashed message to the trusted access monitoring application; and
(d) operating the trusted access monitoring application to:
(i) determine a validity of the file request data by:
generating a decrypted file request message by decrypting the encrypted file request message using the shared communication channel key;
generating a hashed decrypted message by hashing the decrypted file request message using the shared communication channel key;
comparing the hashed decrypted message to the hashed message; and
determining that the received file request data is valid when the hashed decrypted message and the hashed message match; and
(ii) determine that the requesting process is permitted to access the requested file only if the received file request data is valid.

20. The method of claim 12, further comprising:
(a) operating the file access monitoring module to:
(i) receive a file creation request from a creating process operating in the rich operating system;
(ii) determine that the file creation request relates to creating an additional encrypted data file;
(iii) transmit an encrypted file creation request to the trusted access monitoring application, wherein the encrypted file creation request comprises process identification data corresponding to the creating process;

(b) operating the trusted access monitoring application to:
  (i) determine that the creating process is permitted to generate the additional encrypted data file by comparing the process identification data with file creation criteria stored by the trusted access monitoring application;
  (ii) in response to determining that the creating process is permitted to generate the additional encrypted data file,
    generate additional file identification data for the additional encrypted data file based on the file access criteria;
    generate additional key information for the additional encrypted data file;
    generate an additional encryption key for the additional encrypted data file using the additional key information;
    define file access data using the additional file identification data and the additional key information;
    generate additional encrypted file access data by encrypting the file access data using a secret access key stored by the trusted access monitoring application;
    transmit the additional encryption key and the additional encrypted file access data to the file access monitoring module; and
(c) operating the file access monitoring module to:
  (i) provide the additional encryption key and the additional encrypted file access data to a file system of the rich operating system, wherein the file system is operable to use the additional encryption key to generate the additional encrypted data file, and the file system is operable to store the additional encrypted data file in the non-volatile storage memory and to store the additional encrypted file access data in the non-volatile storage memory in association with the additional encrypted data file.

21. The method of claim 12, wherein the file request comprises a file operation request, wherein the file operation request identifies a requested operation that the requesting process is requesting to perform on the requested file, and the method further comprises:
(a) operating the file access monitoring module to include operation data associated with the requested operation in the file request data transmitted to the trusted access monitoring application;
(b) operating the trusted access monitoring application to:
  (i) determine whether the requesting process is permitted to perform the requested operation on the requested file by comparing the file identification data, the process identification data, and the operation data with the file access criteria stored by the trusted access monitoring application; and
  (ii) in response to determining that the requesting process is permitted to perform the requested operation on the requested file, transmit an operation permitted signal to the file access monitoring module;
  (iii) in response to determining that the requesting process is not permitted to perform the requested operation on the requested file, transmit an operation denied signal to the file access monitoring module; and
(c) operating the file access monitoring module to:
  (i) in response to receiving the operation permitted signal, provide the decrypted file to the requesting process to enable the requested operation; and
  (ii) in response to receiving the operational denied signal, prevent the requesting process from performing the requested operation.

22. The method of claim 12, further comprising:
(a) operating the trusted access monitoring application to maintain an activation record of one or more user-specific processes operating on the rich operating system, wherein the activation record includes active process identification data associated with each user-specific process operating on the rich operating system;
(b) operating the file access monitoring module to:
  (i) transmit a process initiation message to the trusted access monitoring application in response to determining that a new user-specific process is operating on the rich operating system, wherein the process initiation message includes the active process identification data associated with the new user-specific process, and wherein the process initiation message is generated using valid user credentials from a user of the processor, wherein the user credentials are solicited from the user following a determination that the new user-specific process is operating on the rich operating system;
  (ii) transmit a process termination message to the trusted access monitoring application in response to determining that a particular user-specific process is no longer operating on the rich operating system, wherein the particular user-specific process is associated with active process identification data included on the activation record, wherein the process termination message includes the active process identification data with the particular user-specific process; and
(c) operating the trusted access monitoring application to
  (i) in response to receiving the process initiation message, update the activation record to include the active process identification data associated with the new user-specific process;
  (ii) in response to receiving the process termination message, update the activation record to remove the active process identification data associated with the particular user-specific process; and
  (iii) determine that the requesting process is permitted to access the requested file only when the activation record includes active process identification data associated with the requesting process.

23. A computer-readable medium having stored thereon non-transitory computer readable instructions for controlling access to a plurality of data files stored in a non-volatile storage memory, wherein the plurality of data files includes a plurality of encrypted data files, the instructions executable by a processor configured to provide at least two isolated execution environments, wherein the at least two isolated execution environments comprise a rich execution environment and a trusted execution environment, and the processor is configured to operate a rich operating system in the rich execution environment and a trusted operating system in the trusted execution environment, wherein the instructions are defined to configure the processor to:
(a) operate a file access monitoring module in a kernel of the rich operating system to:
  receive a file request for a requested file stored in the non-volatile storage memory, wherein the requested file corresponds to one of the encrypted data files in the plurality of encrypted data files, and wherein the file request is received from a requesting process operating on the rich operating system; and transmit file request data to a trusted access monitoring application operating on the trusted operating system, wherein the file request data comprises file access data associated with the requested file and process identification data associated with the requesting process;
(b) operate the trusted access monitoring application to:
receive the file request data;
determine file identification data associated with the requested file from the file access data;
determine whether the requesting process is permitted to access the requested file by comparing the file identification data and the process identification data with file access criteria stored by the trusted access monitoring application; and
in response to determining that the requesting process is permitted to access the requested file:
  derive an encryption key corresponding to the requested file; and
  transmit the encryption key to the file access monitoring module; and
(c) operate the file access monitoring module to, in response to receiving the encryption key, decrypt the requested file using the encryption key, and provide the decrypted file to the requesting process.

\* \* \* \* \*